United States Patent [19]
Nielsen

[11] Patent Number: 5,009,367
[45] Date of Patent: Apr. 23, 1991

[54] METHODS AND APPARATUS FOR OBTAINING WIDER SPRAYS WHEN SPRAYING LIQUIDS BY AIRLESS TECHNIQUES

[75] Inventor: Kenneth A. Nielsen, Charleston, W. Va.

[73] Assignee: Union Carbide Chemicals and Plastics Technology Corporation, Danbury, Conn.

[21] Appl. No.: 327,275

[22] Filed: Mar. 22, 1989

[51] Int. Cl.$^5$ .......................... B05D 1/02; B05D 1/04
[52] U.S. Cl. ........................................ 239/3; 239/1; 239/8; 239/11; 239/13; 427/27; 427/421; 427/422
[58] Field of Search ............... 427/27, 30, 421, 422, 427/426; 239/1, 3, 8, 11, 13

[56] References Cited

U.S. PATENT DOCUMENTS

| | | |
|---|---|---|
| 4,124,528 | 11/1978 | Modell . |
| 4,189,914 | 2/1980 | Marek et al. . |
| 4,375,387 | 3/1983 | deFilippi et al. . |
| 4,582,731 | 4/1986 | Smith . |
| 4,619,735 | 10/1986 | Norton . |
| 4,734,227 | 3/1988 | Smith . |
| 4,734,451 | 3/1988 | Smith . |
| 4,737,384 | 4/1988 | Murthy et al. . |
| 4,882,107 | 11/1989 | Cavender et al. ............... 264/310 X |

FOREIGN PATENT DOCUMENTS

| | | |
|---|---|---|
| 2603664 | 8/1977 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec. 1954.
Smith, R. D. et al., "Direct Fluid Injection Interface for Capillary Supercritical Fluid Chromatography-Mass Spectrometry" J. Chromatog. 247 (1982):231-243.
Krukonis, V., "Supercritical Fluid Nucleation of Difficult-to-Comminute Solids", Paper Presented at 1984 Annual Meeting, AIChE, San Francisco, Calif., 11/25-30/84.
Dandage, D. K. et al., "Structure Solubility Correlations: Organic Compounds and Dense Carbon Dioxide Binary Systems", Ind. Eng. Chem. Prod. Res. Dev. 24: 162-166 (1985).
Matson, D. W. et al., "Production of Powders and Films by the Rapid Expansion of Supercritical Solutions", J. Materials Science 22:1919-1928 (1987).
McHugh, M. A. et al., "Supercritical Fluid Extraction, Principles and Practice", Butterworth Publishers (1986) Contents and Appendix.
Cobbs, W. et al., "High Solids Coatings Above 80% by Volume", Water-Borne & High Solids Coatingts Symposium, Mar. 1980.
Matson, D. W. et al., "Production of Fine Powders by the Rapid Expansion of Supercritical Fluid Solutions", Advances in Ceramics, vol. 21, pp. 109-121 (1987).
Kitamura, Y. et al., "Critical Superheat for Flashing of Super-Heated Liquid Jets", Ind. Eng. Chem. Fund, 25:206-211 (1986).
Petersen, R. C. et al., "The Formation of Polymer Fibers from the Rapid Expansion of SCF Solutions" Pol. Eng & Sci. (1987) vol. 27, p. 1693.

*Primary Examiner*—Evan Lawrence
*Attorney, Agent, or Firm*—Morris N. Reinisch

[57] ABSTRACT

The present invention is directed to methods and apparatus for spraying liquid compositions by airless spray techniques so as to obtain wider spray patterns without having to alter the construction or configuration of conventional nozzles, nozzle tips or spray guns. By means of the present invention, the width of a spray pattern may be changed while the spraying operation is being conducted.

44 Claims, 15 Drawing Sheets

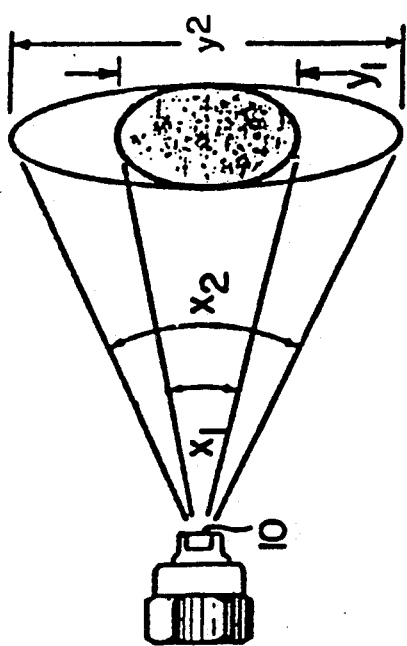
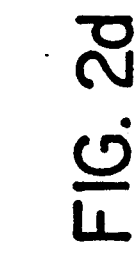
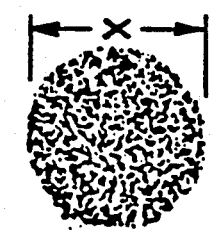
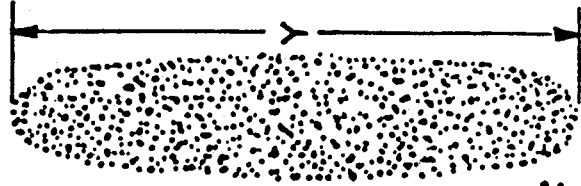
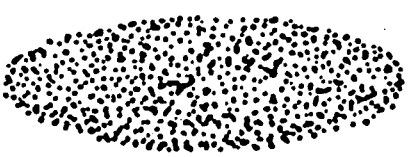

METHODS AND APPARATUS FOR OBTAINING WIDER SPRAYS WHEN SPRAYING LIQUIDS BY AIRLESS TECHNIQUES

RELATED PATENT APPLICATIONS

This application is related to application Ser. No. 133,068, filed Dec. 21, 1987, which is a continuation-in-part of application Ser. No. 833,156, filed July 8, 1986, now abandoned. This application also contains subject matter related to U.S. patent applications Ser. No. 218,896, filed July 14, 1988; and Ser. No. 218,910, filed July 14, 1988.

FIELD OF THE INVENTION

This invention, in general, pertains to the field of spraying liquid compositions. More particularly, the present invention is directed to methods and apparatus for spraying liquid compositions using airless spraying techniques so as to produce a spray pattern which is wider than that expected for a given airless spray nozzle. So too, the present invention relates to being able to vary the width of a spray pattern during a spraying operation.

BACKGROUND OF THE INVENTION

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

Spray nozzle tips for these spraying techniques are generally made having varying orifice sizes and angles to accomodate the coating formulation to be sprayed, the amount to be sprayed, the surface area to be covered, the desired thickness, and the like.

The proper selection of a spray nozzle tip is determined by the fan width for a particular application and by the orifice size which will provide the desired amount of coating formulation and accomplish proper atomization of the material.

Typically, for relatively low viscosity formulations, nozzle tips having smaller orifice sizes are generally preferred. For higher viscosity formulations, nozzle tips having larger orifice sizes are desired. The quantity of fluid sprayed is generally determined by the size of the orifice while the thickness of the applied coating is typically determined by the orifice size and the angle of the spray fan that is produced, conventionally known in the art as the "spray angle". Thus, two nozzle tips having the same orifice size but different spray angles will deposit the same amount of coating formulation but over different surface areas.

For a given set of spraying and coating formulation conditions, it is generally desirable to utilize a nozzle tip which offers as wide a spray as possible so as to coat a larger surface area per unit of time.

The spray angle, which determines the width of the spray measured at a given distance from the nozzle orifice, is a function of the manner in which the orifice is cut into the nozzle tip. Many different airless-type nozzle tip designs are in use today but they generally all require a "V"-type cut to be made in the tip. The depth and angle of the "V"-type cut determines the spray angle and, correspondingly, the width of the spray that is obtained. In general, the deeper and narrower the "V"-type cut, the wider the flat, fan-shaped spray pattern that is produced. However, nozzle tips having large spray angles are difficult and expensive to manufacture. The required deeper and narrower "V"-type cuts are more difficult to make, particularly when made from the typical construction materials that are used for such nozzle tips, for example, tungsten carbide, which is quite brittle.

Thus, airless spray nozzle tips are generally of a type which are capable of producing a flat, fan-shaped spray pattern having a spray angle which typically is no greater than about 70° to about 80° with orifice sizes ranging from about 0.007 to about 0.072 inches.

While attempts have been made to provide airless nozzle tips which produce wider spray Patterns, most have not met with very much success. Moreover, essentially all of these attempts have focused upon mechanical solutions, namely, providing changes in either the construction of the nozzle guns, the nozzles, and/or the nozzle tips, to attempt to provide such desired wider spray patterns. Even when some success is obtained in producing a wider spray angle, such as discussed in for example U.S. Pat. No. 4,097,000, the costs associated with manufacturing and using such modified nozzle and/or nozzle tip arrangements are generally economically prohibitive recognizing that nozzle tips generally have a relatively short useful working life.

Moreover, regardless of the particular nozzle tip being used, if a different spray width is desired, it is generally necessary to change the nozzle tip to provide such a new spray width. Thus, a typical nozzle tip is rated to provide a particular spray width under proper spraying conditions. It generally cannot substantially vary from producing a spray width other than that which it is rated. A change in the spray width cannot, therefore, be obtained while spraying although such flexibility may be quite desirable in some instances.

Clearly, what is needed is a means for providing even wider airless spray patterns using airless spray techniques. Desirably, such means should also be capable of varying the width of the spray during a spraying operation without the need for having to change the nozzle tip. Most desirably, such means should be capable of accomplishing these objectives using conventional airless spray guns, nozzles and nozzle tips without having to modify them in any manner.

SUMMARY OF THE INVENTION

By virtue of the present invention, methods and apparatus have been discovered which are indeed able to accomplish the above noted objectives. Thus, the methods of the present invention are able to produce a wider spray pattern using an airless spray technique without, however, having to modify the mechanical and/or structural characteristics of the nozzle, spray gun, nozzle tip, or the like, as has been necessary in the prior art.

In particular, the present invention is able to utilize essentially any airless spray nozzle tip rated to produce a given spray width and provide an actual spray width which is substantially greater than that rated. Indeed, by virtue of the present invention, the rated spray width may be increased by a factor of about 25% to about 300% or greater. Most significantly, the spray width can be varied from the rated spray width of a nozzle tip to the limit obtainable by the present invention during a spraying operation, without having to change the nozzle tip.

More particularly, the method of the present invention involves a totally new approach to the spraying of liquid mixtures, such as coating formulations, which involves spraying the coating formulation in conjunction with at least one supercritical fluid. By spraying coating formulations which contain supercritical fluid through a nozzle tip, it has been discovered by the present invention that the width of the resulting spray pattern increases as more supercritical fluid is present, which width is greater than that expected for the particular nozzle tip being used.

In other words, when using a nozzle tip having a fan width rating of, for example, 6 inches, the spraying of a coating formulation in admixture with at least one supercritical fluid produces a spray fan width of over 20 to 26 inches, an increase of over 300%. With low concentrations of supercritical fluid in the coating formulation, fan widths of say 10 to 15 inches are produced. As the concentration of supercritical fluid increases, the fan width increases correspondingly until a maximum width is reached which is usually a function of the miscibility of the supercritical fluid with the coating formulation. Significantly, this change in concentration of the supercritical fluid can be obtained while spraying a liquid through the nozzle tip during a spraying operation. Accordingly, the fan width may correspondingly also be varied during such spraying operation.

The ability of the present invention to obtain wider spray angles and correspondingly wider airless spray widths is both economically and commercially desirable. With the present invention, it is now possible to obtain a wider airless spray pattern with a nozzle tip that is rated for a much narrower spray pattern. Such narrower spray pattern nozzle tips are easier to manufacture and consequently are less expensive. As a result, material savings are realized by being able to utilize less expensive nozzle tips.

So too, by means of the present invention, it is now possible to obtain spray widths which heretofore have not been realized. The difficulty of getting wider spray widths by attempting to provide deeper and narrower "V" cuts, or by other alternative mechanical means, is such that a practical upper mechanical and material of construction limit is reached beyond which no meaningful improvement in spray width can realistically be achieved. Yet, it is now possible to provide such desired wider fan spray patterns without having to alter or modify the nozzle tip at all.

Still further, by means of the present invention, the width of the fan spray can now be altered while the spraying operation is being carried out. This can advantageously be useful in those instances where the substrate which is being coated has substantial differences in its overall dimensions. By varying the concentration of the supercritical fluid in the liquid mixture being sprayed, the width of the spray pattern can now be altered so as to accomodate such differences in the dimensions of the substrate while the spraying operation is continuously being conducted.

As used herein, it will be understood that the phrases "coating formulation" or "coating compositions" are meant to include typical, conventional coating compositions which do not have any supercritical fluid admixed therewith. Also as used herein, the phrases "liquid mixture" or "admixed liquid mixture" are meant to include an admixture of a coating formulation with at least one supercritical fluid.

Accordingly, in one aspect, the present invention is directed to a method for the airless spraying of a coating composition which comprises passing the composition under pressure through an orifice to produce a spray pattern having a maximum first width, the said composition comprising (i) a solids fraction, containing at least one component capable of forming a coating on a substrate; and (ii) a solvent fraction which is at least partially miscible with the solids fraction, the improvement which comprises forming a liquid mixture in a closed system, which liquid mixture contains the said (i) and (ii), and also contains (iii) at least one supercritical fluid in at least an amount which when added to (i) and (ii) and sprayed is sufficient to produce a spray pattern having a second width which is greater than the first width.

In an alternative embodiment, the present invention is also directed to a method of increasing the spray width of a sprayed coating composition which is capable of forming a coating on a substrate which comprises admixing at least one supercritical fluid with the coating composition prior to spraying the resulting liquid mixture under pressure through an orifice.

In yet another embodiment of the present invention, a method of varying the spray width of a sprayed coating composition as it is being sprayed is disclosed by admixing at least one supercritical fluid with the coating composition prior to spraying the resulting liquid mixture under pressure through an orifice and varying the concentration of the supercritical fluid admixed with the coating composition.

The preferred supercritical fluid that is used in the present invention is supercritical carbon dioxide.

The apparatus of the invention comprises an apparatus in which the mixture of coating formulation and supercritical fluid is blended and sprayed. Said apparatus is comprised, in combination, of:

(a) means for supplying a solids fraction containing at least one component capable of forming a coating on a substrate;

(b) means for supplying a diluent fraction which is at least partially miscible with the solids fraction;

(c) means for supplying at least one supercritical fluid;

(d) means for forming a liquid mixture of components supplied from (a)–(c); and (e) means for spraying said liquid mixture by passing the mixture under pressure through an orifice to form a wider liquid spray.

The apparatus further comprises (f) means for heating any of said components and/or said liquid mixture of components. Still further, the apparatus further comprises a means for varying the concentration of supercritical fluid in the liquid mixture.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

The ability to combine a supercritical fluid with a liquid coating formulation to produce an effective and useable spray at all, much less, a desirable wider spray pattern which advantageously can be varied in width as the spraying operation is being carried out is quite surprising.

Indeed, prior to the present invention and the inventions described in the above-noted related applications, it was unknown how a high concentration of highly volatile supercritical fluid, such as supercritical carbon dioxide fluid, would affect formation of a liquid spray containing a solids fraction; a solvent fraction in which said solids fraction is dissolved, suspended or dispersed; and a portion of the supercritical fluid. A spray mixture undergoes a large and rapid drop in pressure as it goes through the orifice. Accordingly, one of ordinary skill in the art could theorize that the supercritical spray mixture would produce a foam like shaving cream instead of a spray, because nucleation to form gas bubbles would be so rapid and intense. Alternatively, one of ordinary skill in the art could also expect that the spray mixture would produce a mist or fog of microdroplets instead of a spray, because atomization would be so intense. Another result that one could theorize is that the spray mixture would produce a spray of bubbles instead of droplets. Furthermore, even if a spray were formed, one of ordinary skill in the art could expect that the sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, there is no assurance that the spray could be used to produce quality coatings on a substrate. One of ordinary skill in the art could surmise that the liquid droplets would be so small or have so little momentum that they could not be deposited well onto the substrate. One could also theorize that foaming droplets or supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. One of ordinary skill in the art could also expect that moisture would condense onto the droplets and harm the coating, because the spray would be cooled below the dew point.

Surprisingly, however, liquid sprays having a wider spray pattern using airless spray equipment can indeed be formed by using supercritical fluids and such sprays can be used to deposit quality coatings onto substrates.

BRIEF DESCRIPTION OF THE DRAWINGS

FIG. 1 is a diagrammatic illustration of a spray pattern showing the relationship between the spray angle "x" and spray width "y".

FIGS. 2a–2f are diagrammatic illustrations of spray pattern coating layers obtained on a substrate as the spray is progressively widened from a substantially circular spray having a width "X" (FIG. 2a) to a substantially flat, fan-type spray (FIG. 2f) having a significantly larger width "Y".

FIGS. 9 are photoreproductions of an actual atomized liquid spray that shows how the fan width increases as the amount of supercritical carbon dioxide increases. The spray is produced by a dome- style airless spray tip with a 9-mil orifice size and an 8-inch fan width rating.

DETAILED DESCRIPTION OF THE INVENTION

Figure 3A:
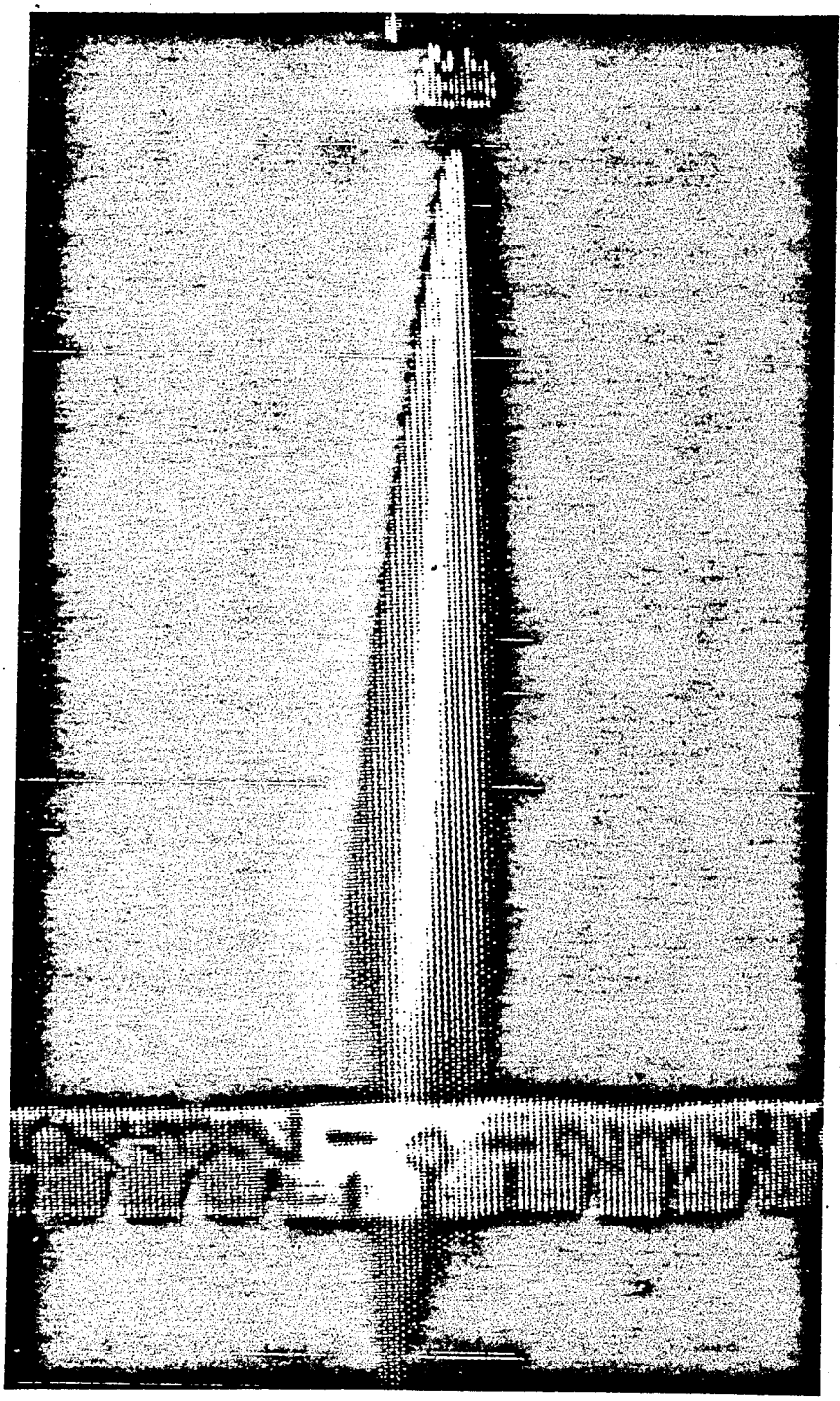
FIGS. 3 are photoreproductions of actual atomized liquid sprays containing no supercritical fluid, which is not in accordance with the present invention, in which the width of the spray pattern is dictated by the maximum width allowed by the nozzle tip. The sprays are with a 9-mil airless spray tip orifice size, with FIGS. 3a, 3b, and 3c having fan width ratings of 2, 4, and 8 inches, respectively.
Figure 3B:
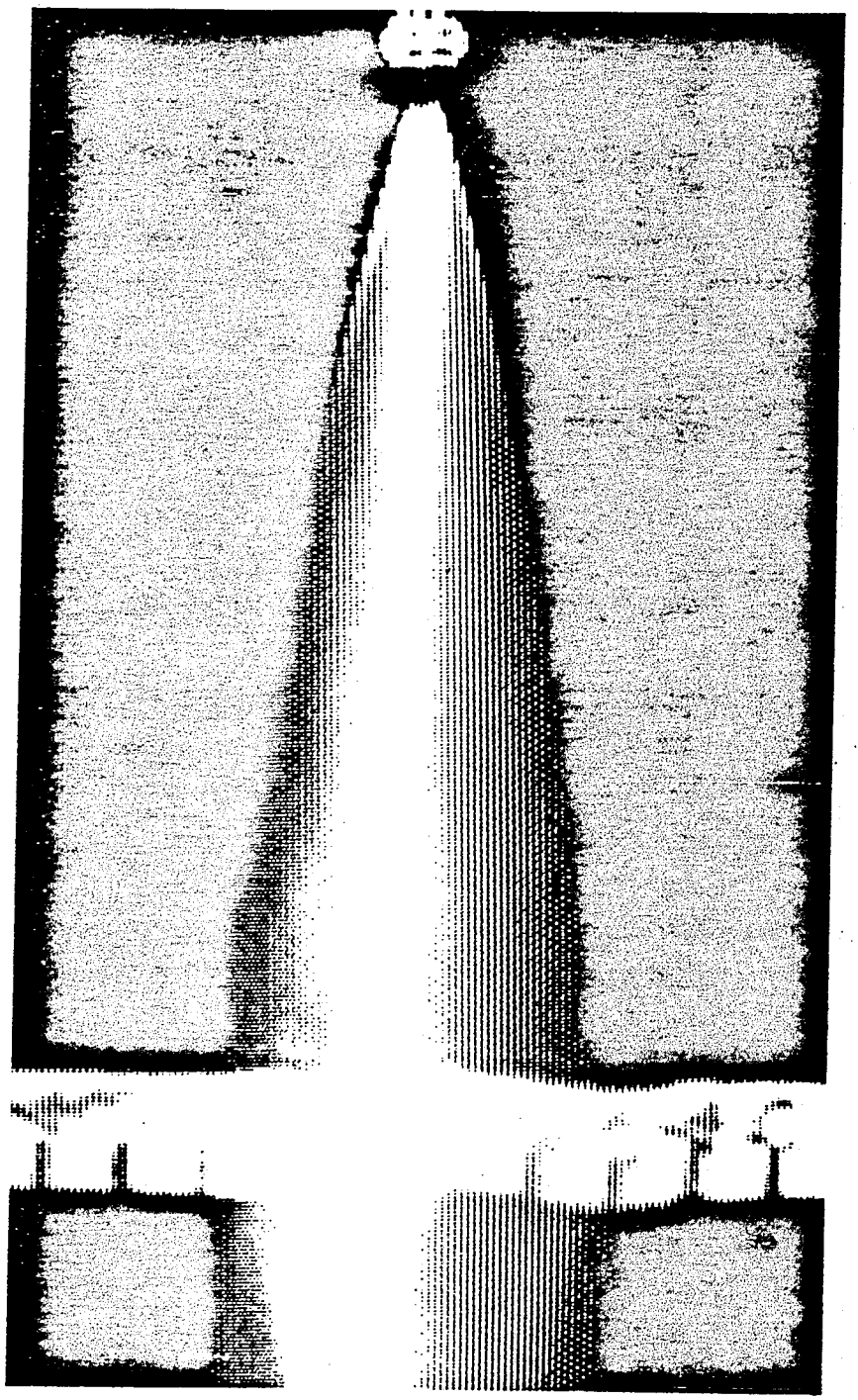
Figure 3C:
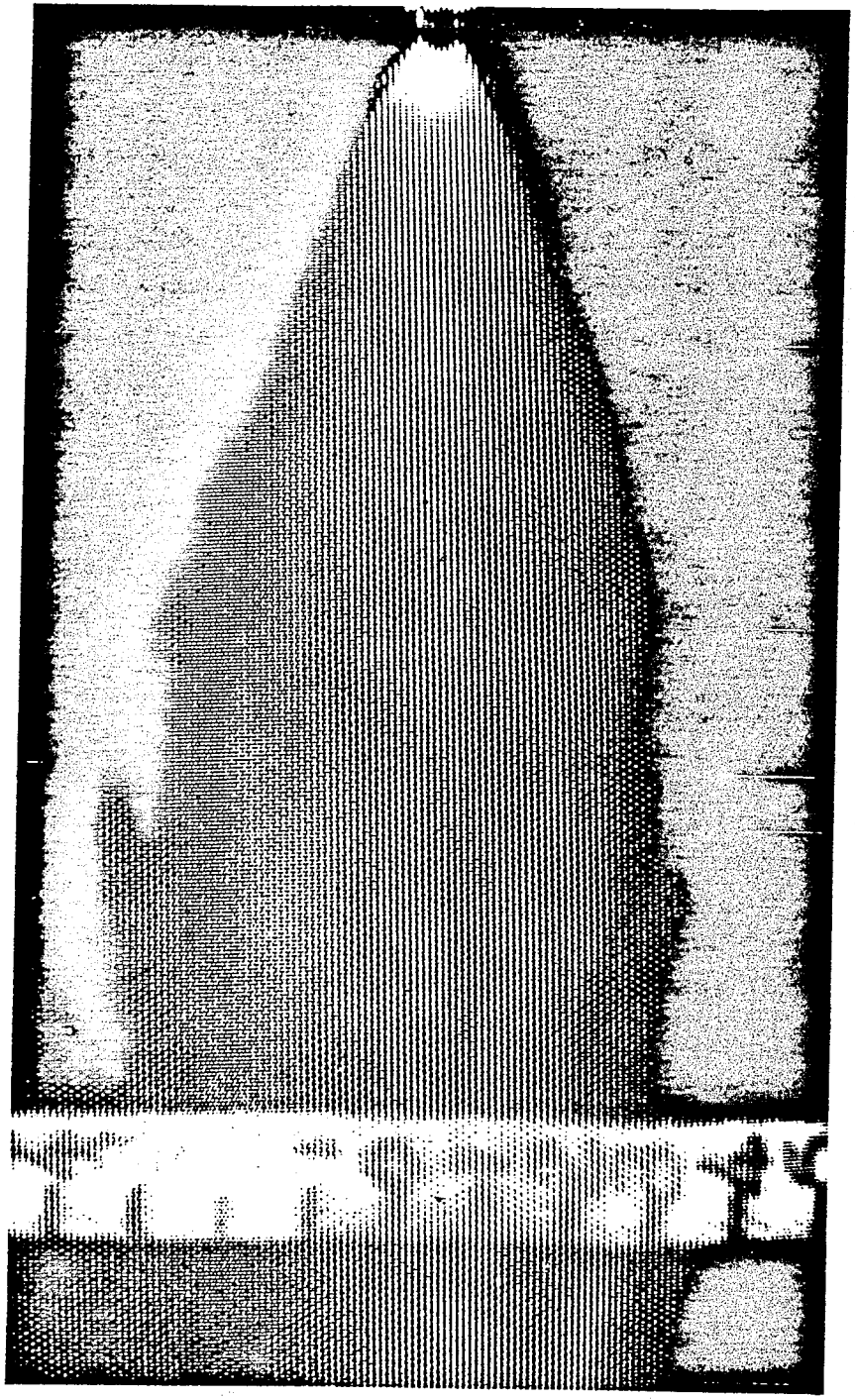

Because of its importance to the claimed invention, a brief discussion of relevant supercritical fluid phenomena is warranted.

Supercritical fluid phenomenon is well documented, see pages F-62 - F-64 of the CRC Handbook of Chemistry and Physics, 67th Edition, 1986-1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" is the transition point at which the liquid and gaseous states of a substance merge into each other and represents the combination of the critical temperature and critical pressure for a given substance. The "critical temperature", as used herein, is defined as the temperature above which a gas cannot be liquefied by an increase in pressure. The "critical pressure", as used herein, is defined as that pressure which is just sufficient to cause the appearance of two phases at the critical temperature.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are given in Table 1.

TABLE 1

| EXAMPLES OF SUPERCRITICAL SOLVENTS | | | | |
| --- | --- | --- | --- | --- |
| Compound | Boiling Point (°C.) | Critical Temperature (°C.) | Critical Pressure (atm) | Critical Density (g/cm³) |
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability, and low critical temperature of carbon dioxide, supercritical carbon dioxide fluid is preferably used with the coating compositions. For many of the same reasons, nitrous oxide ($N_2O$) is a desirable supercritical fluid for admixture with the coating compositions. However, any of the aforementioned supercritical fluids and mixtures thereof are to be considered as being applicable for use with the coating compositions.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is nonflammable.

Due to the solvency effect of the supercritical fluid with the coating formulations, a single phase liquid mixture is able to be formed which is not only capable of being sprayed by airless spray techniques but which forms the desired wider spray patterns.

The present invention is not narrowly critical to the type of coating formulation that can be sprayed provided that there is less than about 30% by weight, preferably less than about 20% by weight of water in the solvent fraction (as herein later defined) of the formulation. Thus, essentially any coating formulation meeting the aforementioned water limit requirement which is conventionally sprayed with an airless spray technique may also be sprayed by means of the methods and apparatus of the present invention. Such coating formulations are typically used for painting and finishing operations or for applying various adhesives compositions, and the like. Such coating formulations may also include those that are typically utilized in the agricultural art in which fertilizers, weed killing agents, and the like are dispensed.

Generally, such coating formulations typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymeric component which is well known to those skilled in the coatings art.

Generally, the materials used in the solids fraction of the present invention, such as the polymers, must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fraction, conventional additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the coating formulations to be sprayed by the methods of the present invention.

In connection with the use of the various additives noted above, it is particularly desirable for pigments to be present in the coating composition inasmuch as it has been found to aid in the diffusion of the supercritical fluid from the sprayed composition resulting in improved atomization.

In addition to the solids fraction, a solvent fraction is also typically employed in coating formulations whether they be an adhesive composition or a paint, lacquer, varnish, or the like, or an agricultural spray, in order to act as a vehicle in which the solids fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight, may also be present in the solvent fraction provided that a coupling solvent is also present in the formulation. All such solvent fractions are suitable in the present invention.

A coupling solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used in the present invention include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, ethoxy 2-propanol, and ethoxy ethoxy ethanol. Also included are lactams such as n-methyl-2-pyrrolidone, and cyclic ureas such as dimethyl ethylene urea.

When water is not present in the coating formulation, a coupling solvent is not necessary, but may still be employed. Other solvents, particularly active solvents, which may be present in typical coating formulations and which may be utilized in the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxyethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.* 58, 1099, 1954.

Of course, there are solvents which can function both as coupling solvents as well as active solvents and the one solvent may be used to accomplish both purposes. Such solvents include, for example, butoxy ethanol, propoxy ethanol and propoxy 2-propanol. Glycol ethers are particularly preferred.

Suitable additives that are conventionally present in coating formulations that are intended for spray application may also be present in this invention, such as, curing agents, plasticizers, surfactants, and the like.

A typical airless tip selection chart showing the relationship between types of coating materials, their viscosities, and tips which are available for such coating materials along with their corresponding spray angles and spray widths is set forth below in Table 2.

TABLE 2

Airless Tip Selection Chart

| Type of Coatings | Viscosity* (seconds) | Orifice Size (inches) | Spray Angle (degrees) | Spray Width** (inches) |
|---|---|---|---|---|
| Lacquers, Sealers | 20–25 | .011 | 40 | 7.5 |
| Stains |  | .013 | 25 | 5.5 |
|  |  | .013 | 50 | 9.0 |
| Automotive | 20–25 | .015 | 40 | 8.5 |
| Primers, |  | .015 | 80 | 13.0 |
| Lacquers, Enamels |  |  |  |  |
| Aluminums, iso- | 30–35 | .015 | 40 | 8.5 |
| Alkyds, Primers, |  | .015 | 80 | 13.0 |
| Plastic Enamels, |  | .018 | 40 | 10.0 |
| Alkyd Flats, |  | .018 | 65 | 13.5 |
| Road Stripping |  |  |  |  |
| Latex, Rustic & | 35–45 | .015 | 40 | 8.5 |
| Shakes Mill |  | .015 | 80 | 13.0 |
| Whites |  | .018 | 40 | 10.0 |
|  |  | .018 | 65 | 13.0 |
|  |  | .021 | 80 | 17.0 |
|  |  | .026 | 65 | 17.0 |
|  |  | .031 | 65 | 15.0 |

*No. 4 Ford Cup.
**With nozzle tip at 12 inches from work surface.

In the present invention, once a supercritical fluid is admixed with a coating formulation and sprayed, as shown in FIG. 1, as the amount of supercritical fluid admixed with the coating formulation is increased, the corresponding fan width increases accordingly. Thus, spray angle $x_1$, corresponding to spray width $y_1$, is the maximum spray angle and width, respectively, that can be obtained with spray nozzle tip 10 when not using supercritical fluid. Once supercritical fluid is added and its concentration is progressively increased, the spray angle and width of the spray obtained correspondingly increases until a spray angle $x_2$ is obtained corresponding to a spray width $y_2$.

The particular amounts of supercritical fluids which are necessary to effect wider patterns will be dependent upon the specific coating formulation, the particular supercritical fluid utilized, and the particular processing conditions. However, it is generally desirable to add as much supercritical fluid as possible to the admixture of coating formulation and supercritical fluid that can be accommodated by the spraying system without causing a decrease in spraying performance so as to obtain the widest possible spray.

Typically, the preferred upper limit of supercritical fluid addition is that which is miscible with the coating formulation. This practical upper limit is generally recognizable when the admixture containing coating formulation and supercritical fluid breaks down into two fluid phases, one phase being the supercritical fluid phase and the other being the diluent fraction phase.

Figure 5:
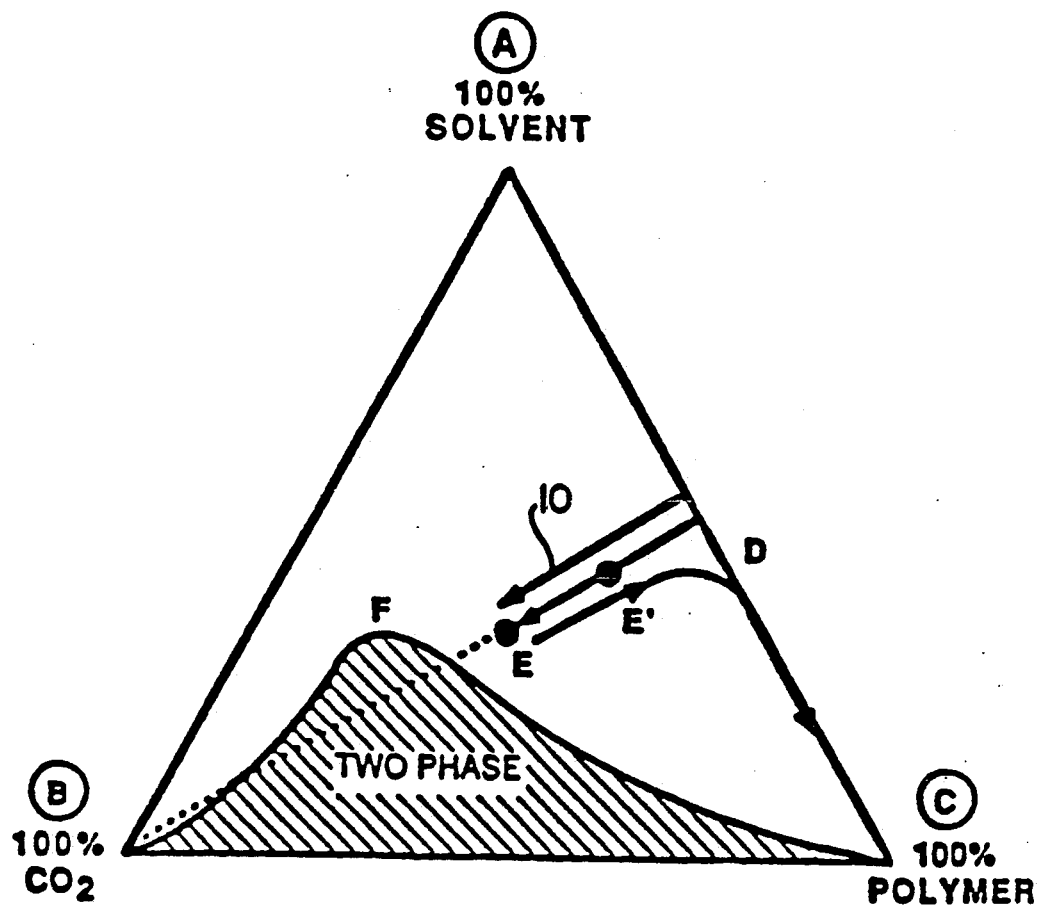
FIG. 5 is a phase diagram of supercritical carbon dioxide fluid spray coating.
Figure 6:
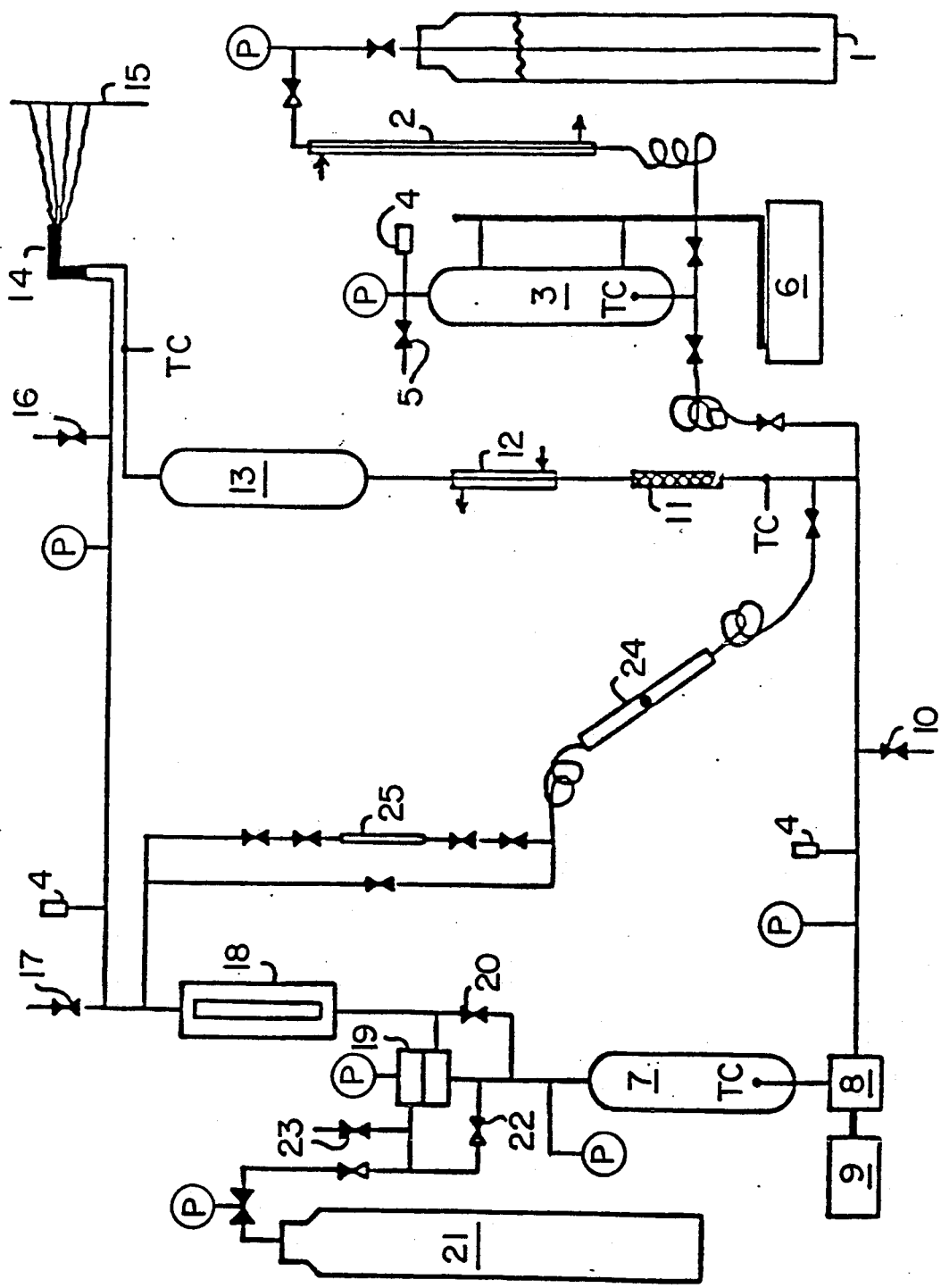
FIG. 6 is a schematic diagram of a spray apparatus that can be used for spraying the liquid mixture of coating formulation and supercritical fluid.
Figure 7:
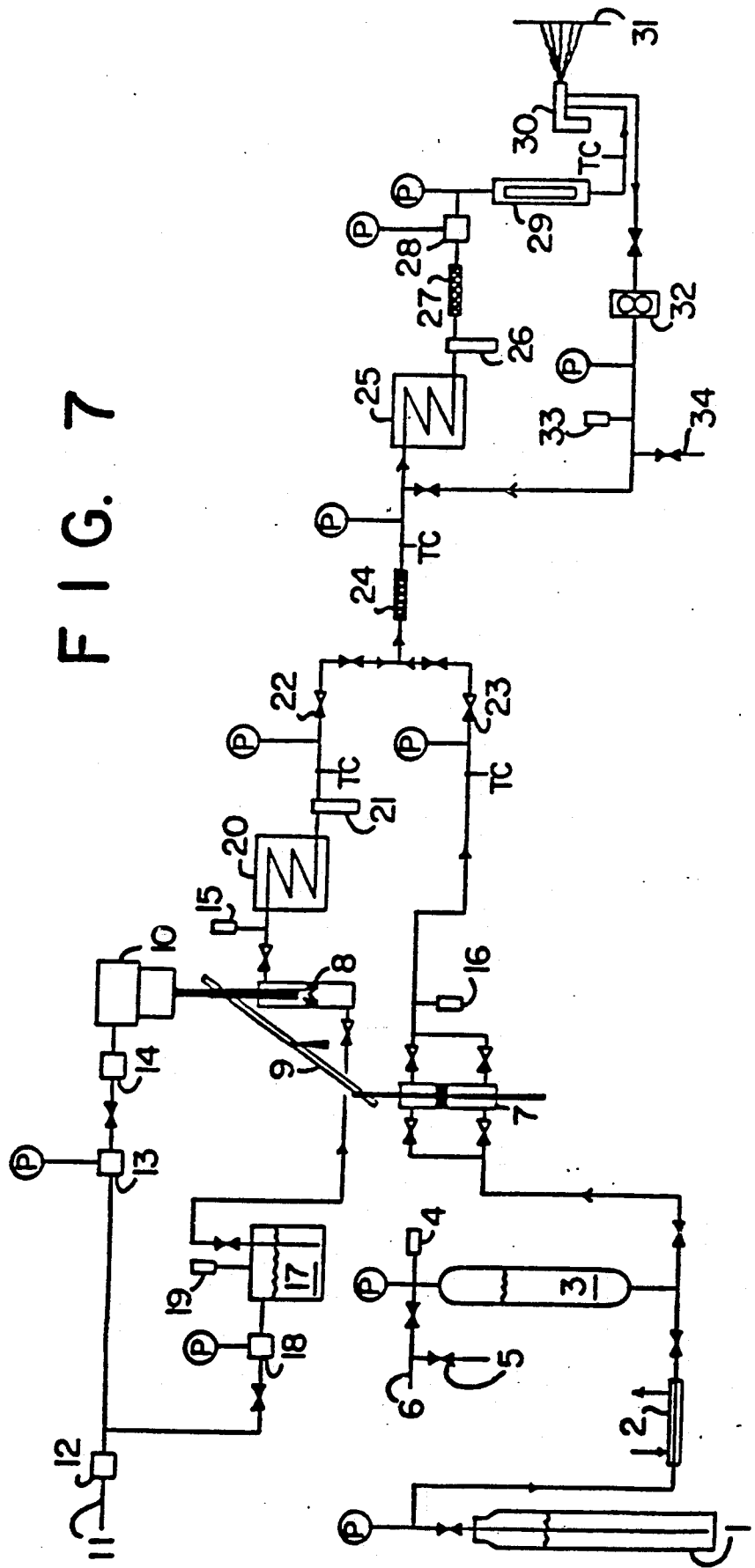
FIG. 7 is a schematic diagram of yet another spray apparatus that can be used with the liquid mixture of coating formulation and supercritical fluid.
Figure 8:
FIG. 8 is a photoreproduction of an actual atomized liquid spray that contains 25% supercritical carbon dioxide and produces a measured fan width of 26 inches from a Nordson cross-cut type spray tip that has a 9-mil orifice size and a 6-inch fan width rating.
Figure 9A:
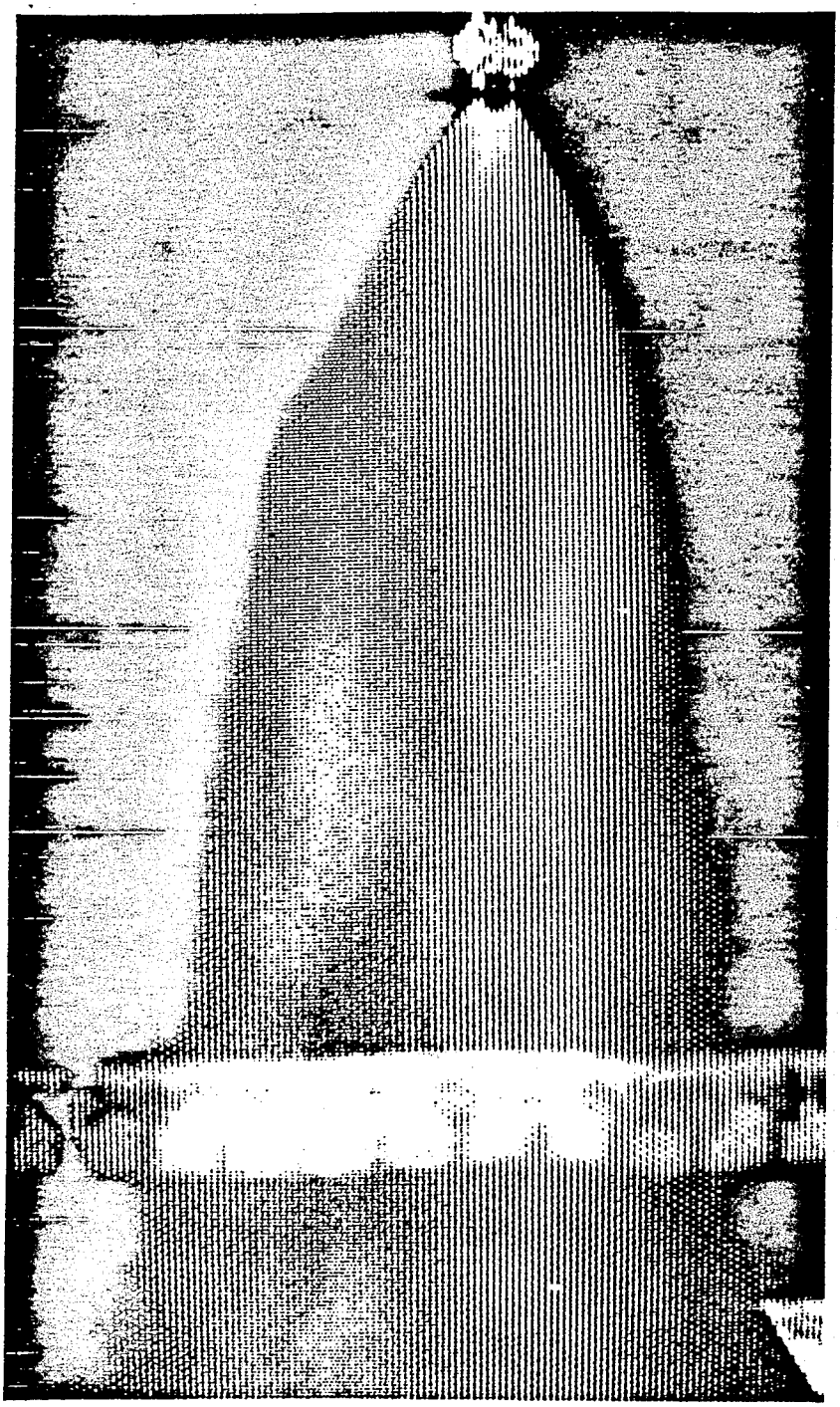
FIGS. 9a, 9b, 9c, and 9d show the increase in fan width that occurs for supercritical carbon dioxide concentrations of 0%, 14%, 20%, and 25% , for an acrylic coating formulation.
Figure 9B:
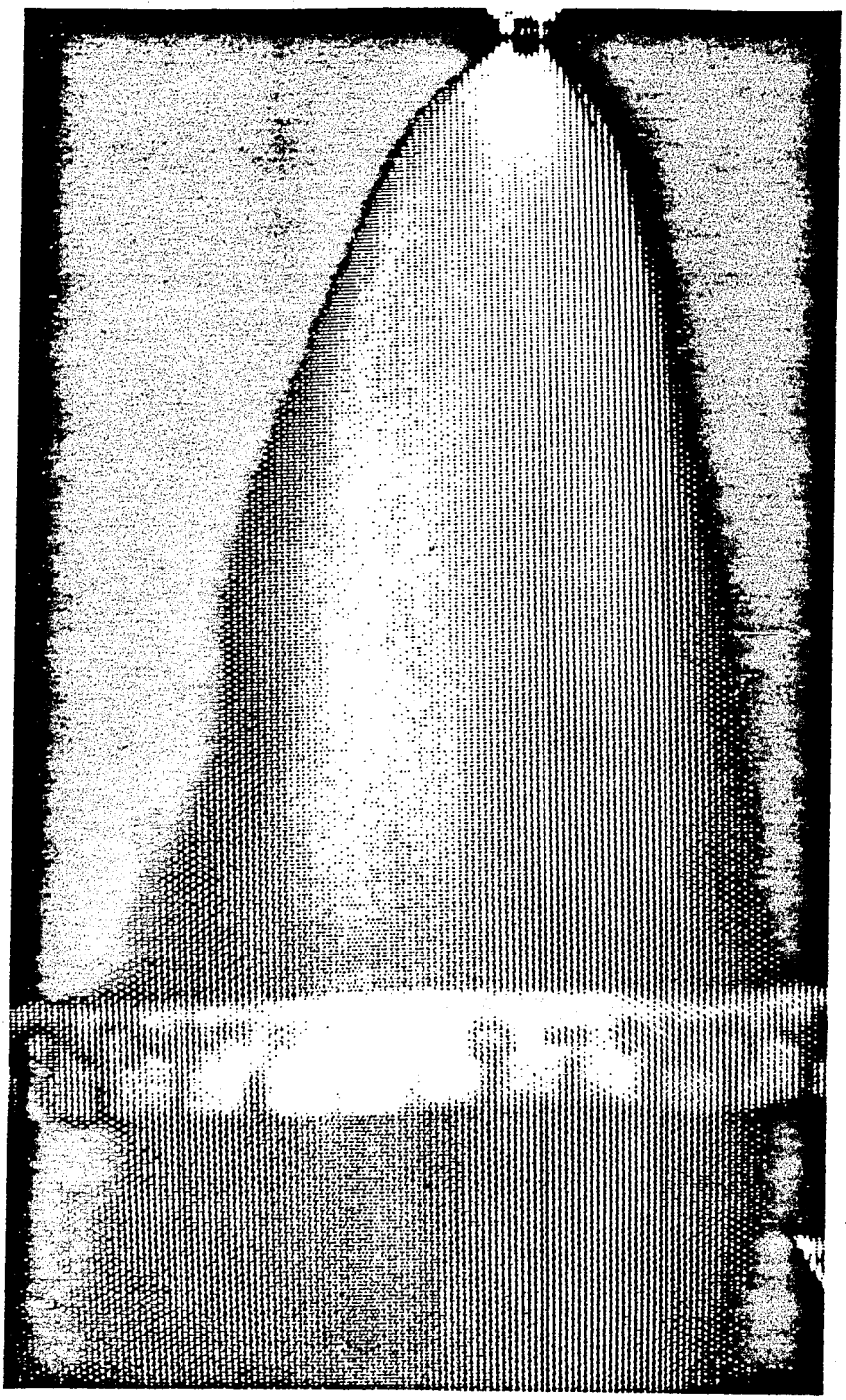
Figure 9C:
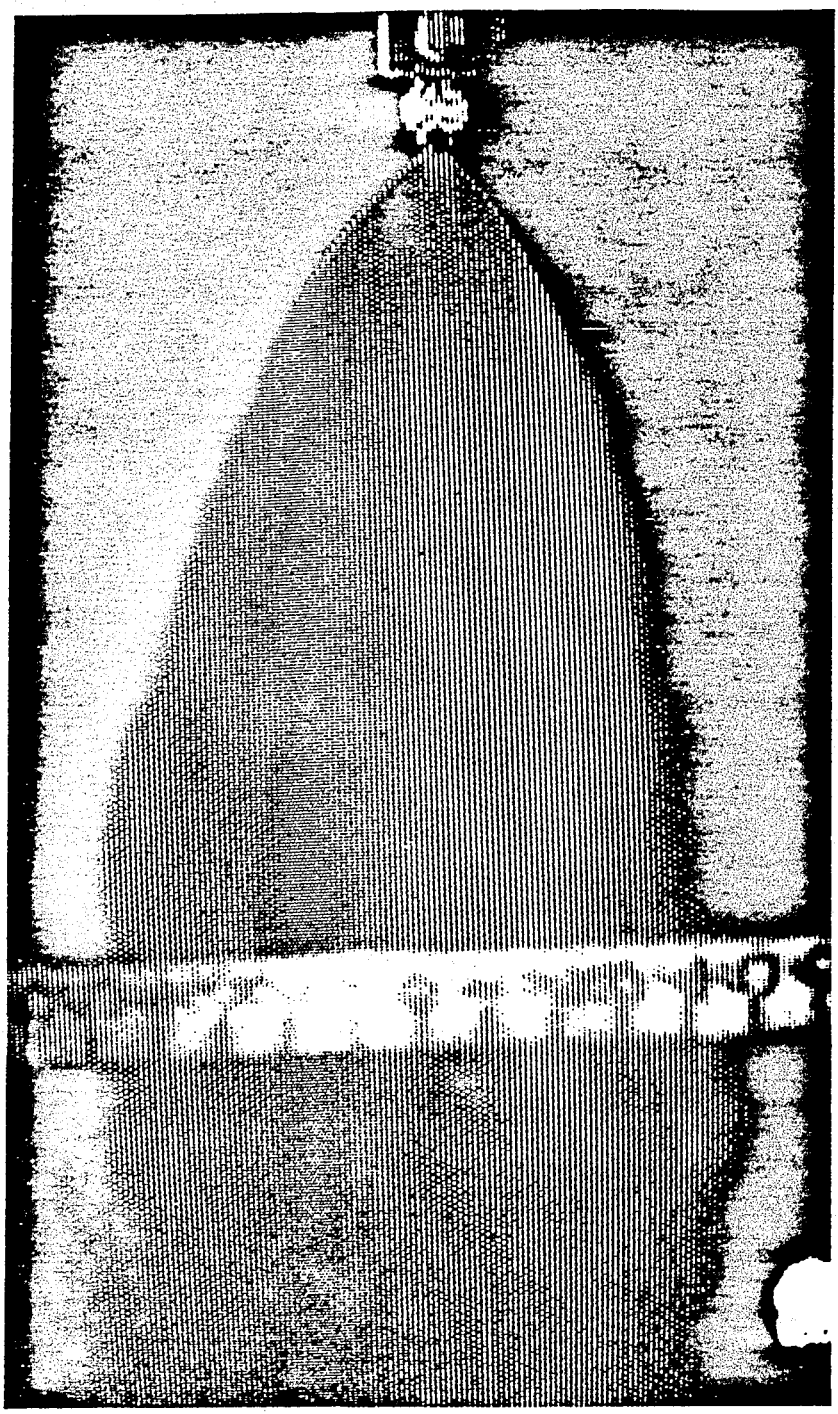
Figure 9D:

To better understand this phenomenon, reference is made to the phase diagram in FIG. 5 wherein the supercritical fluid is supercritical carbon dioxide fluid. In FIG. 5, the vertices of the triangular diagram represent the pure components of an admixed coating formulation which for the purpose of this discussion contains no water. Vertex A is an organic solvent, vertex B is carbon dioxide, and vertex C represents a polymeric material. The curved line BFC represents the phase boundary between one phase and two phases. The point D represents a possible composition of a coating formulation in which supercritical carbon dioxide has not been added. The point E represents a possible composition of an admixed coating formulation, after admixture with supercritical carbon dioxide.

Thus, after atomization, a majority of the carbon dioxide vaporizes, leaving substantially the composition of the original coating formulation. Upon contacting the substrate, the remaining liquid mixture of the polymer and solvent(s) component(s) will flow, i.e., coalesce, to produce a uniform, smooth film on the substrate. The film forming pathway is illustrated in FIG. 5 by the line segments EE'D (atomization and decompression) and DC (coalescence and film formation).

However, the amount of supercritical fluid, such as supercritical carbon dioxide, that can be admixed with a coating formulation is generally a function of the miscibility of the supercritical fluid with the coating formulation as can best be visualized by referring to FIG. 5.

As can be seen from the phase diagram, particularly as shown by arrow 10, as more and more supercritical carbon dioxide is added to the coating formulation, the composition of the admixed liquid coating mixture approaches the two-phase boundary represented by line BFC. If enough supercritical carbon dioxide is added, the two-phase region is reached and the composition correspondingly breaks down into two fluid phases, which, although it can still be sprayed, is generally not desirable for optimum spraying performance and/or coating formation.

Accordingly, the amount of supercritical fluid that should be employed in order to provide a wider spray pattern should generally be in an amount of at least about 10% based upon the total weight of the admixed liquid mixture containing the solids fraction, the solvent fraction and the supercritical fluid, up to a preferred maximum of the solubility limit of the supercritical fluid with the coating formulation which is generally identified by a breakup of the admixed liquid mixture into two fluid phases.

Referring again to FIG. 1, the spray width $y_1$, which is the maximum width of a spray obtainable from a given nozzle tip, can be increased by a factor of up to about 300%, typically about 25 to 200%, and most typically about 50 to 150% by means of addition of supercritical fluids. To obtain the maximum width $y_2$, the maximum amount of supercritical fluid that can be admixed with the coating formulation is utilized so as to keep the admixed liquid mixture in a single phase and still provide proper spraying characteristics. Generally, about 25 to 50% of supercritical fluid, based on the total weight of the liquid mixture, is utilized.

The effect of adding supercritical fluid to a sprayed coating formulation is vividly demonstrated in the photoreproductions shown in FIGS. 3 and 4, respectively. In FIG. 3, which is not in accordance with the present invention, a coating formulation is sprayed without supercritical fluid through dome-style airless spray tips having a 9-mil orifice size and fan width ratings of 2, 4, and 6 inches, which produce measured fan widths of 2, 4, and 6 inches, respectively. As more supercritical fluid is added, the spray pattern develops into a much wider spray, such as those shown in FIG. 4 for the same same spray tips as in FIG. 3, but with about 28% supercritical carbon dioxide added to the liquid mixture, at a spray temperature of 60 C. and a pressure of 1600 psig. FIG. 3*a* shows a spray tip with a 2- inch fan width rating producing a fan that is about seven inches wide. FIG. 3*b* shows a spray tip with a 4-inch fan width rating producing a fan that is about ten inches wide. FIG. 3*c* shows a spray tip with an 8-inch fan width rating producing a fan that is about fourteen inches wide.

FIG. 8 shows that, by using a Nordson cross- cut type spray tip (#911–354) that has a 9-mil orifice size and a 6-inch fan width rating, with 25% supercritical carbon dioxide dissolved in a polyester coating formulation at a temperature of 60 C. and pressure of 1600 psig, the spray produced is very wide, having a measured width of 26 inches, which is over four times the rated fan width. Material was sprayed through the spray tip without carbon dioxide to verify that indeed a six-inch fan width is produced.

FIGS. 9 show how the fan width increases as the amount of supercritical carbon dioxide increases in the liquid mixture. The spray is produced by a dome-style spray tip with a 9-mil orifice size and an 8-inch fan width rating. The fan width increases from 8, to 10, to 12, to 14 inches as the supercritical carbon dioxide concentration increases from 0% , to 14%, 20%, and 25% . The material is an acrylic coating formulation sprayed at a temperature of 60 C. and pressure of 1600 psig. For a 9-mil orifice size, the largest fan width that is commonly available is ten inches. Therefore, FIGS. 4, 8, and 9 show that by using supercritical carbon dioxide, spray width can be markedly increased over available technology.

For some coatings, the spray width does not increase uniformly as the supercritical fluid concentration increases as it does for other coatings, such as in FIG. 9. Instead, the spray passes through a transition at some intermediate concentration whereby the spray suddenly contracts and becomes an oval spray instead of a flat fan. However, at larger supercritical fluid concentrations the spray returns to a flat fan that is significantly wider.

Without wishing to be bound by theory, it is believed that the explosive atomization that creates a much wider spray fan is produced by the dissolved supercritical fluid in the admixed liquid mixture suddenly becoming exceedingly supersaturated as the liquid mixture is sprayed from the nozzle and experiences sudden and large drop in pressure. This creates a large driving force for gasification of the dissolved supercritical fluid, which overcomes the surface tension forces that oppose atomization and bind the fluid flow together into a narrower spray.

The characteristics of the coating layers which may be obtained by spraying with supercritical fluids onto a substrate is demonstrated in FIGS. 2*a*–2*b*. In FIG. 2, a diagrammatic representation of the coated particles is shown. In FIG. 2*a*, the coated particles are concentrated in a pattern having a width X. As more and more supercritical fluid is admixed with the coating formulation and sprayed to provide an admixed liquid mixture containing higher concentrations of the supercritical fluid, two things generally happen. Firstly, the spray pattern gets progressively wider until it reaches a maximum width of about Y at which the miscibility limit between the supercritical fluid and the coating formulation has generally been reached. Secondly, the concentration per unit area of surface coated is progressively decreased as the spray is widened. Thus, although the same amount of coating formulation is applied per unit of time, a larger surface area is now being covered which results in a reduction of coating solids applied per unit of surface area.

If desired, in order to compensate for this decrease in coating concentration, the relative traversal speed between the nozzle orifice and the substrate to be coated may simply be decreased proportionately.

It is to be understood that although FIG. 2*a* shows a starting spray pattern which is circular in shape and FIG. 2*f* shows an ending spray pattern which is in a substantially flat, fan-like shape, these shapes are only exemplary. The starting pattern need not be circular, and indeed, may be elliptical or a flat, fan-spray. So too, the ending pattern need not be fan-shaped as well. Generally the shape of the spray is a function of the sprayed composition and the spray temperature and pressure conditions. Typically, however, a flat, fan-shape type nozzle is used in airless spray techniques.

The coating formulations, after having been admixed with supercritical fluid, are then sprayed by passing them under pressure through an orifice into the environment of the substrate to be sprayed.

An orifice is a hole or an opening in a wall or housing, such as in a spray tip of a spray nozzle on an electrostatic spray gun, through which the admixed liquid coating composition flows in going from a region of higher pressure, such as inside the spray gun, into a region of lower pressure, such as the air environment, outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic airless and air-assisted airless spraying of coating formulations such as paints, lacquers, enamels, varnishes and agricultural sprays are suitable for spraying the coating compositions when admixed with supercritical fluids in accordance with the present invention. Spray guns, nozzles, and tips are preferred that do not have excessive flow volume between the orifice and the valve that turns the spray on and off. The spray guns, nozzles, and tips must be built to contain the spray pressure used.

There are a broad variety of spray devices that one may use in spraying the coating formulation after it has been admixed with supercritical fluid. Essentially, any spray gun may be used containing essentially any nozzle tip, from conventional airless and air-assisted airless spray devices to electrostatic spray devices. The choice of spray device is dependent upon the kind of application that is contemplated.

The material of construction of the orifice through which the admixed liquid mixture is sprayed must possess the necessary mechanical strength for the high spray pressure used, have sufficient abrasion resistance to resist wear from fluid flow, and be inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for spraying the admixed liquid mixture should generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore, small orifice sizes from about 0.004-inch to about 0.025-inch diameter are preferred. Orifice sizes from about 0.007-inch to about 0.015-inch diameter are most preferred.

The designs of the spray tip that contains the spray orifice and of the spray nozzle that contains the spray tip are not critical. The spray tips and spray nozzles should have no protuberances near the orifice that would interfere with the spray.

The shape of the spray is also not critical to being able to spray the admixed liquid mixture. The spray may be in the shape of a cone that is circular or elliptical in cross section or the spray may be in the shape of a flat fan, but the spray is not limited to these shapes. Sprays that are flat fans or cones that are elliptical in cross section are preferred.

The distance from the orifice to the substrate is generally at a distance of from about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used. Such techniques include but are not limited to the use of pre-orifices, diffusers, turbulence plates, restrictors, flow splitters/combiners, flow impingers, screens, baffles, vanes, and other inserts, devices, and flow networks that are used in electrostatic airless spray and air-assisted airless spray.

Filtering the liquid mixture prior to flow through the orifice is desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces may be used to increase the proportion of coating formulation that is deposited onto a substrate from the spray. This is commonly referred to as increasing the transfer efficiency. This is done by using a high electrical voltage relative to the substrate to impart an electrical charge to the spray. This creates an electrical force of attraction between the spray droplets and the substrate, which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably the spray is charged negative relative to electrical ground.

The method of charging the spray is not critical to the practice of the invention provided the charging method is effective. The coating formulation can be electrically charged by applying high electrical voltage relative to the substrate and electrical current (1) within the spray gun, by direct contact with electrified walls or internal electrodes before leaving the orifice; (2) after the spray emerges from the orifice, by electrical discharge from external electrodes located near the orifice and close to the spray; or (3) away from the orifice, by passing the spray through or between electrified grids or arrays of external electrodes before the spray is deposited onto the substrate. Methods (1) and (2), individually or in combination, are preferred. Method (2) is most preferred.

In charging method (1) above, the spray gun must be electrically insulating. The high voltage and electrical current is supplied to the admixed liquid mixture inside the gun by direct contact with an internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the admixed liquid mixture as it flows through the gun. This internal charging method has the advantage of having no external electrode that could interfere with the spray. A disadvantage is that if the admixed liquid mixture is not sufficiently electrically insulating, electrical current leakage can occur through the admixed liquid mixture to a grounded feed supply tank or feed delivery system. This reduces the amount of charge going to the spray. If current leakage is too high, then the feed supply tank and feed delivery system must be insulated from electrical ground, that is, be charged to high voltage. Current leakage can be measured by measuring the current flow from the high voltage electrical power supply without fluid flow. The current charging the spray is then the difference between the current with fluid flow and the current without fluid flow. The leakage current should be small compared to the charging current.

In charging method (2) above, the spray is electrically charged after it emerges from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation in between such that the electrical current issuing from the sharp point is favorably directed to the spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the admixed liquid mixture than charging method (1). Admixed liquid mixtures that are sufficiently conductive must have the feed supply and feed line insulated from electrical ground. In charging method (3) above, the spray is electrically charged farther away from the orifice and is more fully dispersed than in method (2). Therefore a larger system or network of external electrodes is usually required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The spray is passed through or between electrified grids or arrays of external electrodes before the spray is deposited onto the substrate. The spray droplets are charged by ion bombardment from the electrical current discharged into air from the electrodes. The electrified grid may be one or several wires electrodes that extend across the spray area. Current can discharge from along the length of the electrodes. The electrified array may be one or several wires or pointed electrodes positioned around the spray area and which extend close to or into the spray such that current discharges from the ends of the electrodes.

The present invention can be used with high electrical voltage in the range of about 30 to about 150 kilovolts. Higher electrical voltages are favored to impart higher electrical charge to the spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of electrostatic spraying.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. Conventional high voltage electrical power supplies can be used. The power supply should have standard safety features that prevent current or voltage surges. The electrical power supply may be built into the spray gun. Other charging methods may also be used.

The spray pressure used is a function of the coating formulation, the supercritical fluid being used, and the viscosity of the liquid mixture. The minimum spray pressure is at or slightly below the critical pressure of the supercritical fluid. Generally, the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used is a function of the coating formulation, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° centigrade. The maximum temperature is determined by the thermal stability of the components in the liquid mixture. The preferred spray temperature is between 35° and 90° centigrade. The most preferred temperature is between 45° and 75° centigrade. Generally, liquid mixtures with greater amounts of supercritical carbon dioxide fluid require higher spray temperatures to counteract the greater cooling effect.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment into which the admixed coating composition is sprayed is not critical. However, the pressure therein must be less than that required to maintain the supercritical fluid component of the liquid spray mixture in the supercritical state. Preferably, the admixed liquid coating composition is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. These liquid droplets contain a portion of the solids fraction, a portion of the solvent fraction, and a portion of the supercritical fluid. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate. Small spray droplets also give higher quality finishes.

The process of the present invention may be used to apply coatings by the application of liquid spray to a variety of substrates. Examples of suitable substrates include but are not limited to metal, wood, glass, plastic, paper, cloth, ceramic, masonry, stone, cement, asphalt, rubber, composite materials, and agriculturally related substrates.

Through the practice of the present invention, films may be applied to substrates such that the cured films have thicknesses of from about 0.2 to about 6.0 mils. Preferably, the films have thicknesses of from about 0.5 to about 2.0 mils, while most preferably, their thicknesses range from about 0.7 to about 1.5 mils.

If curing of the coating composition present upon the coated substrate is required, it may be performed at this point by conventional means, such as allowing for evaporation of the active and/or coupling solvent, application of heat or ultraviolet light, etc.

Compressed gas may be utilized to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the electrostatic spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist gas are lower than those used in air spray. The assist gas may be heated to counteract the rapid cooling effect of the supercritical fluid diluent in the spray. The preferred temperature of heated assist gas ranges from about 35° to about 90° centigrade. The most preferred temperature ranges from about 45° to about 75° centigrade.

The coating formulations may be admixed with a supercritical fluid and then sprayed to produce a wider spray pattern by a spray apparatus such as that shown in either FIGS. 6 or 7.

The following illustrates apparatus that may be used to obtain the admixed coating composition of precursor coating composition and supercritical fluid and spray it in a batch mode in the practice of the present invention. The supercritical fluid illustrated is supercritical carbon dioxide fluid.

Table 3 contains a listing of the equipment used in conducting the procedure described for the batch mode.

TABLE 3

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating, mounted on scale; carbon dioxide feed tank. |
| 4. | Circle Seal TM pressure relief valve P168-344-2000 set at 1800 psig. |
| 5. | Vent valve. |
| 6. | Sartorius 16-kilogram scale with 0.1-gram sensitivity. |
| 7. | Hoke cylinder #8HD2250, 2.25-liter volume, made of 304 stainless steel, having double end connectors, 1800-psig pressure rating; pump supply tank. |
| 8. | Zenith single-stream gear pump, model #HLB-5592-30CC, modified by adding a thin Grafoil TM gasket to improve metal-to-metal seal. |
| 9. | Zenith gear pump drive model #4204157, with 15:1 gear ratio, and pump speed controller #QM-371726F-15-XP, with speed range of 6 to 120 revolutions per minute. |
| 10. | Drain from circulation loop. |
| 11. | Kenics static mixer. |
| 12. | Cooling water heat exchanger. |
| 13. | Hoke cylinder #8HD2250, 2.25-liter volume, made of 304 stainless steel, having double end connectors, 1800-psig pressure rating; spray supply tank. |
| 14. | Airless spray gun. |
| 15. | Bonderite TM 37 polished 24-gauge steel panel, 6-inch by 12-inch size. |
| 16. | Vent valve. |
| 17. | Liquid feed valve. |
| 18. | Jerguson high-pressure sight glass series T-30 with window size #6 rated for 2260 psig pressure at 200 F. temperature. |
| 19. | Grove back-pressure regulator #5-90-W, rated for 2000 psig at 200 F. temperature; dome is charged with pressurized nitrogen to desired spray pressure. |
| 20. | Bypass valve. |
| 21. | Pressurized nitrogen to set Grove back-pressure regulator and to purge unit. |
| 22. | Nitrogen purge valve. |
| 23. | Nitrogen vent valve. |
| 24. | Ruska rolling-ball high-pressure viscometer #1602-811-00 with temperature controller and electronic timer. |
| 25. | Pyncnometer, double-valved one-quarter-inch high-pressure tubing. |

The apparatus listed in Table 3 above is assembled as shown in the schematic representation contained in FIG. 3. Rigid connections are made with ⅛-inch diameter high-pressure tubing for gas flows and with ¼-inch diameter high-pressure tubing for liquid flows, using Swagelok TM fittings. The spray gun is connected to the tubing by using two Graco flexible ¼-inch static-free nylon high-pressure hoses model #061-214 with 5000-psi pressure rating. Check valves are used to prevent back flow to the carbon dioxide feed tank (3) and bulk supply tank (1) and to the nitrogen cylinder (21). The circulation loop and carbon dioxide feed tank are protected from overpressurization by pressure relief valves (4).

The apparatus consists of a circulation loop, a carbon dioxide feed system, and a side loop to measure viscosity and density. The circulation loop contains a pump supply tank (7), a gear pump (8) to provide circulation and maintain constant spray pressure, a static mixer (11), a cooler (12) to remove excess heat, a spray supply tank (13), an airless spray gun (14), a sight glass (18), and a pressure regulator (19) to maintain constant spray pressure. The pressure regulator (19) is set by using compressed nitrogen (21) regulated to the desired flow pressure. The carbon dioxide feed system contains a carbon dioxide bulk supply cylinder (1), a refrigeration heat exchanger (2), and a carbon dioxide feed tank (3) mounted on an electronic scale (6). The feed and exit lines to the feed tank (3) are coiled so that the force of the tank moving on the scale does not affect the scale reading. The side loop contains a viscometer (24) and pyncnometer (25) for measuring the viscosity and density of the admixed coating composition, if desired.

All flow lines and tanks are lined with electrical heat tape and covered with insulation to heat the solution to spray temperature. The heat tape is divided into several circuits that are controlled independently Circuit #1 Pressure regulator (19), bypass line (20), sight glass (18), and connecting lines.
Circuit #2 Pump supply tank (7), gear pump (8), and line in circulation loop to carbon dioxide feed point.
Circuit #3 Line in circulation loop from carbon dioxide feed point to cooler (12).
Circuit #4 Spray supply tank (13).
Circuit #5 Line from spray supply tank (13) to flexible hose connected to spray gun (14).
Circuit #6 Carbon dioxide feed tank (3).

Thermocouples located within the tanks and lines measure temperature. Admixed coating composition temperature is kept uniform around the loop by rapid circulation and by adjusting the heat tapes.

The batch spray unit is filled by the following procedure. The unit is evacuated through the circulation loop vent (16) and a weighed amount of precursor coating composition is added through the feed valve (17) with the gear pump (8) circulating the material at a slow rate through the pressure regulator bypass valve (20). The carbon dioxide feed tank (3) is evacuated through the vent valve (5) and filled with liquid carbon dioxide from the carbon dioxide supply cylinder (1). To make filling the feed tank (3) easier, the carbon dioxide is passed through a refrigeration heat exchanger (2), so that the vapor pressure in the feed tank (3) is lower than the vapor pressure in the supply tank (1). The desired mass of carbon dioxide is pressurized into the circulation loop by heating the carbon dioxide feed tank (3) and valving in the desired amount as read on the balance (6).

The spray pressure is generated by filling the unit with precursor coating composition and carbon dioxide to the required overall density and then heating it to the spray temperature. Prior to spraying, the pressure regulator (19) is bypassed (20) and the loop is at a uniform pressure. To prepare for spraying, the bypass (20) is closed so that the flow goes through the pressure regulator (19), which is adjusted to the flow pressure. During spraying, the spray pressure is kept constant by the gear pump (8) and the pressure regulator (19). The gear pump (8) pumps solution into the spray supply tank (13) from the pump supply tank (7) at a high circulation rate. The pressure regulator (19) discharges excess solution back into the pump supply tank (7). The pump supply tank (7) loses inventory and pressure, but the spray supply tank (13) is kept full and at spray pressure.

The following illustrates apparatus that may be used to obtain the admixed coating composition of precursor coating composition and supercritical fluid and spray it in a continuous mode in the practice of the present invention. The supercritical fluid illustrated is supercritical carbon dioxide fluid.

Table 4 contains a listing of the equipment used in conducting the procedure described for the continuous mode.

TABLE 4

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating. |
| 4. | Circle Seal TM pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon TM packings mounted in #5 Hydra-Cat Cylinder Slave Kit #947-948; pump and feed line are refrigeration traced; carbon dioxide pump. |
| 8. | Graco standard double-acting primary piston pump model #207-865 with Teflon TM packings; coating concentrate pump. |
| 9. | Graco Variable Ratio Hydra-Cat TM Proportioning Pump unit model 226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |
| 22. | Graco check valve model #214-037 with Teflon TM seal. |
| 23. | Graco check valve model #214-037 with Teflon TM seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure sight glass series T-30 with window size #6 rated for 2260 psig pressure at 200 F. temperature. |
| 30. | Airless spray gun. |
| 31. | Bonderite TM 37 polished 24-gauge steel panel, 6-inch by 12-inch size. |
| 32. | Zenith single-stream gear pump, model #HLB-5592-30C, modified by adding a thin Grafoil TM gasket to improve metal-to-metal seal, with pump drive model #4204157, with 15:1 gear ratio, and pump speed controller model #QM-371726F-15-XP, with speed range of 6 to 120 revolutions per minute. |
| 33. | Circle Seal TM pressure relief valve P168-344-2000 set at 2000 psig. |
| 34. | Drain from circulation loop. |

The precursor coating composition and carbon dioxide are pumped and proportioned by using a Graco Variable Ratio Hydra-Cat# Proportioning Pump unit (9). It proPortions two fluids together at a given volume ratio by using two piston pumps (7 and 8) that are slaved together. The piston rods for each pump are attached to opposite ends of a shaft that pivots up and down on a center fulcrum. The volume ratio is varied by sliding pump (7) along the shaft, which changes the stroke length. The pumps are driven on demand by an air motor (10). Pumping pressure is controlled by the air pressure that drives the air motor. The pumps are double-acting; they pump on upstroke and downstroke. The primary pump (8) is used to pump the coating formulation. It is of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The coating formulation is supplied to the primary pump (8) from a two-gallon pressure tank (17). After being pressurized in the pump to spray pressure, the coating formulation is then heated in an electric heater (20) to reduce its viscosity (to aid mixing with carbon, dioxide), filtered in a fluid filter (21) to remove particulates, a check valve (22) into the mix point with carbon dioxide. The secondary pump (7) on the proportioning pump unit (9) is used to pump the liquid carbon dioxide. A double-acting piston pump (7) with a four-check-valve design is used because of the high vapor pressure of carbon dioxide. The pump has an inlet and an outlet on each side of the piston; no flow occurs through the piston. The proportion of carbon dioxide pumped into the admixed liquid mixture is varied by moving the secondary pump (7) along the moving shaft. Bone-dry-grade liquid carbon dioxide is pumped from cylinder (1) through refrigeration heat exchanger (2) to secondary pump (7). For measuring the carbon dioxide uptake rate, the carbon dioxide is pumped from Hoke cylinder (3) through heat exchanger (2) to pump (7). The liquid carbon dioxide is refrigerated in heat exchanger (2) in order to lower the vapor pressure, to prevent cavitation in pump (7). The Hoke cylinder (3) is filled from cylinder (1). Air or gaseous carbon dioxide in the cylinder (3) is vented (5) during filling. The Hoke cylinder (3) is mounted on a 16-kilogram Sartorius electronic scale with 0.1-gram sensitivity so that the amount of carbon dioxide in it can be weighed. After being pressurized to spray pressure in pump (7), the liquid carbon dioxide is fed unheated through check valve (23) to the mix point with the coating formulation. After the coating formulation and carbon dioxide are proportioned together at the mix point, the admixed liquid mixture is mixed in static mixer (24) and pumped on demand into a circulation loop, which circulates the admixed liquid mixture at spray pressure and temperature to or through the spray gun (30). The admixed liquid mixture is heated in an electric heater (25) to obtain the desired spray temperature and filtered in a fluid filter (26) to remove particulates. Fluid pressure regulator (28) is installed to lower the spray pressure below the pump pressure, if desired, or to help maintain a constant spray pressure. A Jerguson sight glass (29) is used to examine the phase condition of the admixed liquid mixture. Circulation flow in the circulation loop is obtained through the use of gear pump (32).

The pressure tank (17) is filled with the precursor coating concentrate and pressurized with air to 50 psig. The primary pump (8) is primed by opening a drain valve on the bottom of filter (21) until air is purged from the line.

The carbon dioxide secondary pump (7) is positioned along the pivoting shaft to give the desired percentage of maximum piston displacement. The refrigeration flow is adjusted to a temperature of −10 C. and circulated through the refrigeration heat exchanger (2) and the refrigeration tracing on pump (7). The carbon dioxide feed line and circulation loop are filled with carbon dioxide and vented through valve (34) several times to purge air from the system. Then the valves to the mixing point are closed and the carbon dioxide feed line is filled to prime pump (7).

The air pressure regulator (13) is adjusted to supply the air motor (10) with air at the desired pressure to pressurize the feed lines. The valves to the mix point are opened and the circulation loop filled with material. With the circulation loop return valve closed, to give plug flow around the circulation loop with no backmixing, material is drained from valve (34) until a uniform composition is obtained. Heater (20) is adjusted to give a feed temperature of 37 C. The circulation heater (25) is adjusted to give the spray temperature. The circulation loop return valve is opened and the spray mixture is circulated at a high rate by adjusting the gear pump (32). The carbon dioxide content of the admixed liquid mixture is measured by measuring the carbon dioxide uptake rate from Hoke cylinder (3) and the coating formulation uptake rate from pressure tank (17) while spraying through the spray gun. Then the carbon dioxide feed is switched back to supply cylinder (1).

An alternative method of proportioning the coating formulation and supercritical fluid in a continuous mode uses a mass proportionation apparatus instead of the volumetric proportionation apparatus illustrated above. The variable ratio proportioning pump unit (9) with pumps (7) and (8) shown in FIG. 4 is replaced with an apparatus having the following elements. For pumping the carbon dioxide, the double-acting four-ball piston pump (7) is driven individually on demand by attaching air motor (10) directly to it instead of being driven by the moving beam. Alternatively, the carbon dioxide can be pumped by using an air-driven cryogenic pump such as Haskel model DSF-35, which is a single-acting pump that utilizes a three-way cycling spool that is designed for pumping liquefied gases under pressure without requiring refrigeration to avoid cavitation. The pressurized carbon dioxide is then passed through a pressure regulator, which is used to control the desired spray pressure, and then through a mass-flow meter, such as Micro Motion model D6, which measures the flow rate of carbon dioxide as it is pumped on demand. For pumping the coating formulation, the standard double-acting primary piston pump (8) is replaced with a variable speed gear pump, such as the Zenith gear pump (32) that is used in the circulation loop. The gear pump pumping rate is controlled by a signal processor that receives the instantaneous carbon dioxide flow rate from the mass flow meter and then controls the gear pump revolution rate to pump the coating formulation at the proper flow rate to give the desired proportion of coating formulation and carbon dioxide in the admixed liquid mixture. An accumulator, such as Tobul model 4.7A30-4, may be installed in the circulation loop to increase the loop capacity and to minimize pressure pulsations in the loop when the spray gun is activated.

EXAMPLE 1

A coating formulation that gives a clear acrylic coating was prepared from Rohm & Haas Acryloid AT-400 resin, which contains 75% nonvolatile acrylic polymer dissolved in 25% methyl amyl ketone solvent, Acryloid AT-954 resin, which contains 80% nonvolatile acrylic polymer dissolved in 20% methyl amyl ketone solvent, and American Cyanamid Cymel 323 resin, which is a cross-linking agent that contains 80% nonvolatile melamine polymer dissolved in 20% isobutanol solvent, by mixing the resins with the solvents n-butanol, ethyl 3-ethoxypropionate (EEP), methyl amyl ketone, and xylene in the following proportions:

| | | |
|---|---|---|
| Acryloid AT-400 | 6,520.5 g | |
| Acryloid AT-954 | 1,917.8 g | |
| Cymel 323 | 2,718.0 g | |
| n-butanol | 626.0 g | |
| EEP | 889.0 g | |
| methyl amyl ketone | 320.0 g | |
| xylene | 39.0 g | |
| Total | 13,030.3 g | |

The coating formulation contained 66.73% solids fraction and 32.97% solvent fraction.

The coating formulation and carbon dioxide were pressurized, mixed, heated, and sprayed in the continuous mode. The coating formulation was sprayed at a temperature of 60 C. and pressure of 1600 psig both by itself and with about 30% carbon dioxide, which gave a clear single-phase solution. The liquid mixture was sprayed with the following Nordson and Spraying Systems spray tips, which have a 9-mil orifice size and different fan width ratings. All were dome-style spray tips, except for the Nordson cross-cut tip #711–354. The spray width was measured according to the fan width deposited on a metal panel at a distance of 10 to 12 inches from the spray tip. The following fan widths were measured:

| Spray Tip | Fan Width Rating | Measured Fan Without CO$_2$ | Widths With CO$_2$ |
|---|---|---|---|
| 016-014; 500011 | 8 inch | 8 inch | 14 inch |
| 016-013 | 6 inch | 6 inch | 12 inch |
| 016-012 | 4 inch | 4 inch | 10 inch |
| 016-011 | 2 inch | 2 inch | 7 inch |
| 711-354 | 6 inch | 6 inch | 18 inch |

This shows that the fan width was considerably wider with supercritical carbon dioxide dissolved into the liquid mixture.

EXAMPLE 2

A coating formulation that gives a clear acrylic coating that requires no cross-linking or baking was prepared from Rohm & Haas Acryloid B-66 resin by dissolving the resin in methyl amyl ketone solvent. The coating formulation contained 35.00% solids fraction and 65.00% solvent fraction, with the following component composition:

| | | |
|---|---|---|
| Acryloid B-66 | 5,600.0 g | 35.00% |
| methyl amyl ketone | 10,400.0 g | 65.00% |
| Total | 16,000.0 g | 100.00% |

The coating formulation and carbon dioxide were pressurized, mixed, heated, and sprayed in the continuous mode. The coating formulation was sprayed at a temperature of 60 C. and pressure of 1600 psig both by itself and with about 40% carbon dioxide, which gave a clear single-phase solution. The liquid mixture was sprayed with the following Nordson and Spraying Systems spray tips, which have a 9-mil orifice size and different fan width ratings. All were dome-style spray tips, except for the Nordson cross-cut tip #711–354. The spray thickness was measured according to the fan width deposited on a metal panel at a distance of 10 to 12 inches from the spray tip. The following fan widths were measured:

| Spray Tip | Fan Width Rating | Measured Fan Without CO$_2$ | Widths With CO$_2$ |
|---|---|---|---|
| 500011 | 8 inch | 8 inch | 16 inch |
| 016-013 | 6 inch | 6 inch | 13–14 inch |
| 016-012 | 4 inch | 4 inch | 11 inch |
| 016-011 | 2 inch | 2 inch | 8 inch |
| 711-354 | 6 inch | 6 inch | 20 inch |

EXAMPLE 3

A coating formulation that gives a clear acrylic coating was prepared from Acryloid AT-400 resin, Acryloid AT-954 resin, and Cymel 323 resin, by mixing the resins with the solvents n-butanol, ethyl 3-ethoxypropionate (EEP), methyl amyl ketone, methyl ethyl ketone, and xylene in the following proportions:

| | |
|---|---|
| Acryloid AT-954 | 1,197.9 g |
| Acryloid AT-400 | 4,072.9 g |
| Cymel 323 | 1,697.8 g |
| n-butanol | 391.0 g |
| EEP | 555.3 g |
| methyl amyl ketone | 199.9 g |
| methyl ethyl ketone | 2,860.8 g |
| xylene | 24.4 g |
| 50% L5310 in xylene | 32.9 g |
| Total | 11,032.9 g |

The coating composition contained 49.23% solids fraction and 50.77% solvent fraction.

The coating formulation and carbon dioxide were pressurized, mixed, heated, and sprayed in the continuous mode. The admixed liquid mixture was sprayed using a Nordson A7A circulating airless automatic spray gun with tip #016–014, which has a The liquid mixture was sprayed at a temperature of 60 C. and a pressure of 1600 psig at different concentrations of carbon dioxide. The fan width was measured as a function of carbon dioxide in the liquid mixture:

| Carbon Dioxide | Fan Width |
|---|---|
| 0% | 8 inch |
| 14% | 10 inch |
| 20% | 12 inch |
| 25% | 14 inch |

The spray fan width increased continuously with increase in carbon dioxide concentration.

EXAMPLE 4

A coating composition that gives a clear polyester coating was prepared from Spencer Kellog Aroplaz 6025-A6-80 resin, which contains 80% nonvolatile polyester polymer dissolved in 20% methyl PROPASOL acetate (MPA) solvent, and Cymel 323 resin, by mixing the resins with the solvents n-butanol and butyl CELLOSOLVE acetate (BCA) in the following Proportions:

| | |
|---|---|
| Aroplaz 6025-A6-80 | 11,000.0 g |
| Cymel 323 | 3,666.7 g |
| n-butanol | 450.0 g |
| BCA | 2,250.0 g |
| 50% L5310 in xylene | 75.0 g |
| Total | 17,441.7 g |

The coating formulation contained 67.27% solids fraction and 32.73% solvent fraction.

The coating formulation and carbon dioxide were pressurized, mixed, heated, and sprayed in the continuous mode. An admixed liquid mixture with a carbon dioxide content of 25.5% was sprayed at a temperature of 70 C. and pressure of 1600 psi, which gave a clear single-phase solution. The liquid mixture was sprayed using a Nordson A7A circulating airless automatic spray gun with a Spraying Systems tip #500011 with a minimum cavity insert and also with Nordson tips #016-011 and #016-012, all of which have a 9-mil orifice size and width ratings of 8, 2, and 4 inches, respectively. The spray tips gave the following measured fan widths:

| Spray Tip | Fan Width Rating | Fan Width Measured |
|---|---|---|
| 500011 | 8 inch | 18 inch |
| 016-012 | 4 inch | 11 inch |
| 016-011 | 2 inch | 8 inch |

EXAMPLE 5

A coating formulation that gives a clear cellulose acetate butyrate (CAB) coating that requires no crosslinking or baking was prepared by dissolving Eastman Chemical Cellulose Ester CAB-381-0.1 in solvents methyl amyl ketone, methyl ethyl ketone, and butyl CELLOSOLVE acetate (BCA). The coating formulation contained 25.00% solids fraction and 75.00% solvent fraction, with the following component composition:

| | | |
|---|---|---|
| CAB | 4,800.0 g | 25.00% |
| methyl ethyl ketone | 4,480.0 g | 23.33% |
| methyl amyl ketone | 6,720.0 g | 35.00% |
| BCA | 3,200.0 g | 16.67% |
| Total | 19,200.0 g | 100.00% |

The coating formulation and carbon dioxide were pressurized, mixed, heated, and sprayed in the continuous mode. The liquid mixture was sprayed by itself and with a carbon dioxide content of about 36%, at at a pressure of 1600 psig and a temperature of 60 C., which gave a clear single-phase solution. The liquid mixture was sprayed using a Nordson A7A circulating airless automatic spray gun with Spraying Systems and Nordson airless tips with a 9-mil orifice size. Panels were sprayed using a Spraymation automatic sprayer, flashed, and air dried. The following fan widths were measured:

| Spray Tip | Fan Width Rating | Measured Fan Without $CO_2$ | Widths With $CO_2$ |
|---|---|---|---|
| 500011 | 8 inch | 8 inch | 13 inch |
| 016-013 | 6 inch | 6 inch | 11 inch |
| 016-012 | 4 inch | 4 inch | 7 inch |
| 016-011 | 2 inch | 2 inch | 4 inch |
| 711-354 | 6 inch | 6 inch | 26 inch |

All of the tips were done style, except for Nordson cross-cut tip 711-354. The sprays with carbon dioxide were significantly larger than without. The cross-cut style tip gave a larger fan width than the dome style.

What is claimed is:

1. In a method for the airless spraying of a coating composition which comprises passing the composition under pressure through an orifice to produce a spray pattern having a maximum first width, the said composition comprising (i) a solids fraction containing at least one component capable of forming a coating on a substrate; and (ii) a solvent fraction which is at least partially miscible with the solids fraction, the improvement which comprises forming a liquid mixture in a closed system, which liquid mixture contains the said (i) and (ii), and also contains (iii) at least one supercritical fluid in at least an amount which when added to (i) and (ii) and sprayed is sufficient to produce a spray pattern having a second width which is greater than the first width.

2. The method of claim 1, wherein the solids fraction contains at least one polymeric compound which is selected from the group consisting of thermoplastic resins, thermosetting resins, crosslinkable film forming systems, and mixtures thereof.

3. The method of claim 2, wherein said at least one polymeric compound is selected from the group consisting of enamels, varnishes, lacquers, acrylic resins, vinyl resins, styrenic resins, polyesters, alkyds, polyurethanes, urethanes, epoxies, phenolics, cellulosic esters, amino resins, natural gums, natural resins, and interpolymers and mixtures thereof.

4. The method of claim 1 in which the solids fraction further comprises pigments, pigment extenders, metallic flakes, fillers, drying agents, anti-foaming agents, anti-skinning agents, wetting agents, ultraviolet absorbers, cross-linking agents, and mixtures thereof.

5. The method of claim 1, wherein the solvent fraction contains at least one active solvent selected from the group consisting of ketones, esters, ethers, glycol ethers, glycol ether esters, alcohols, aromatic hydrocarbons, aliphatic hydrocarbons, nitroalkanes, unsaturated hydrocarbons, halocarbons, and mixtures thereof.

6. The method of claim 1 in which the solvent fraction contains up to about 30% by weight of water.

7. The method of claim 6 in which the solvent fraction contains up to about 20% by weight of water.

8. The method of claim 6 in which the solvent fraction contains a coupling solvent.

9. The method of claim 8, wherein the coupling solvent is selected from the group consisting of ethylene glycol ethers, propylene glycol ethers, lactams, cyclic ureas, and mixtures thereof.

10. The method of claim 8, wherein the coupling solvent is selected from the group consisting of butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, ethoxy 2-propanol, and ethoxy ethoxy ethanol, n-methyl-2-pyrrolidone, dimethyl ethylene urea, and mixturs thereof.

11. The method of claim 10, wherein the coupling solvent and the active solvent are the same.

12. The method of claim 1 which is sprayed with supercritical carbon dioxide fluid.

13. The method of claim 1 which is sprayed with supercritical nitrous oxide fluid.

14. The method of claim 1 further comprising prior to spraying, heating said liquid mixture to a temperature sufficient to prevent the adverse effect caused by rapid cooling when said liquid mixture is sprayed.

15. The method of claim 1, wherein the supercritical carbon dioxide fluid is present in amounts ranging from about 10 to about 50 weight % based upon the total weight of the liquid mixture.

16. The method of claim 1, wherein the orifice size ranges from about 0.004 to about 0.072 inch in diameter.

17. The method of claim 16, wherein the orifice size ranges from about 0.004 to about 0.025 inch in diameter.

18. The method of claim 16, wherein the orifice size ranges from about 0.007 to about 0.015 inch in diameter.

19. The method of claim 1, wherein the spray pressure ranges from about the critical pressure of the supercritical fluid to about 5000 pounds per square inch.

20. The method of claim 19, wherein the spray pressure is below about 3000 pounds per square inch.

21. The method of claim 1, further comprising, prior to spraying, promoting turbulent or agitated flow of said liquid mixture to aid atomization of said liquid spray.

22. The method of claim 1, further comprising utilizing jets of compressed gas to assist formation and atomization of said liquid spray and to modify the shape of said liquid spray.

23. The method of claim 22, wherein said compressed gas is compressed air.

24. The method of claim 23, wherein said compressed air has lowered oxygen content to reduce flammability of said liquid spray.

25. The method of claim 24, wherein said compressed gas is compressed carbon dioxide.

26. The method of claim 24, wherein said compressed gas is selected from the group consisting of compressed nitrogen, helium, argon, xenon, and mixtures thereof.

27. The method of claim 25, wherein the pressure of said compressed gas ranges from about 5 to about 80 pounds per square inch.

28. The method of claim 27, wherein the pressure of said compressed gas ranges from about 5 to about 20 pounds per square inch.

29. The method of claim 24, wherein said compressed gas is heated to supply heat to the liquid spray to prevent the adverse effect caused by rapid cooling when said liquid mixture is sprayed.

30. The method of claim 1, wherein the second width is about 300 greater than the first width.

31. The method of claim 1, where the second width is about 25 to 200% greater than the first width.

32. The method of claim 1, where the second width is about 50 to 150% greater than the first width.

33. The method of claim 1 in which the liquid mixture is electrically charged by a high electrical voltage.

34. The method of claim 33, wherein said high electrical voltage ranges from about 30 to about 150 kilovolts.

35. A method of increasing the spray width of an airless sprayed coating composition which is capable of forming a coating on a substrate which comprises admixing at least one supercritical fluid with the coating composition prior to spraying the resulting liquid mixture under pressure through an orifice, wherein the amount of supercritical fluid admixed is sufficient to increase the spray width.

36. A method of varying the spray width of an airless sprayed coating composition as it is being sprayed by admixing at least one supercritical fluid with the coating composition prior to spraying the resulting liquid mixture under pressure through an orifice and varying the concentration of the supercritical fluid admixed with the coating composition, wherein the amount of supercritical fluid admixed is sufficient to vary the spray width.

37. The methods of claim 35 or 36 in which the supercritical fluid admixed with the coating composition is supercritical carbon dioxide fluid.

38. The method of claims 35 or 36 in which the supercritical fluid admixed with the coating composition is supercritical nitrous oxide fluid.

39. The methods of claims 35 or 36 wherein the supercritical fluid is present in amounts ranging from about 10 to about 60 weight % based upon the total weight of the liquid mixture.

40. The methods of claims 35 or 36 in which the spray width is increased by a factor of about 300% based on a spray width sprayed with a coating composition containing no supercritical fluid.

41. The method of claim 40, wherever the spray width is increased by a factor of from about 25 to 200%.

42. The method of claim 40, wherever the spray width is increased by a factor of from about 50 to 150%.

43. The methods of claims 35 or 36 in which the liquid mixture is electrically charged by a high electrical voltage.

44. The method of claim 43 wherein the high electrical voltage ranges from about 30 to about 150 kilovolts.

* * * * *

UNITED STATES PATENT AND TRADEMARK OFFICE
CERTIFICATE OF CORRECTION

PATENT NO. : 5,009,367

DATED : April 23, 1991

INVENTOR(S) : Kenneth A. Nielsen

It is certified that error appears in the above-identified patent and that said Letters Patent is hereby corrected as shown below:

Title Page:
Item[54] and Col. 1, line 2 delete "an apparatus".

At line 1 of the abstract, delete " The present invention is directed to methods and apparatus", to "Methods".

At line 2 of the Abstract, after "liquid", insert --coating--.

At line 5 of the Abstract, after "guns." insert --The width of a spray pattern is increased by admixing at least one supercritical fluid with the coating composition prior to spraying, in an amount sufficient to increase the spray width.--

Column 2, line 53, "fan-shaPed" should read --fan-shaped--.

Column 4, line 4, "sPray" should read --spray--.

Column 4, line 8, "Pattern" should read --pattern--.

Column 22, Table 4, line 21, "#947-948" should read --#947-943--.

UNITED STATES PATENT AND TRADEMARK OFFICE
CERTIFICATE OF CORRECTION

PATENT NO. : 5,009,367
DATED : April 23, 1991
INVENTOR(S) : Kenneth A. Nielsen

Figure 4A:
FIGS. 4 are photoreproductions of the actual atomized liquid spray of FIG. 3 to which supercritical fluid, namely, about 28% supercritical carbon dioxide, has now been added in accordance with the present invention to produce a fan width which is much greater than than obtained in FIG. 3. The sprays are with a 9-mil dome-style airless spray tip orifice size, with FIGS. 4a, 4b, and 4c having fan width ratings of 2, 4, and 8 inches, respectively.
Figure 4B:
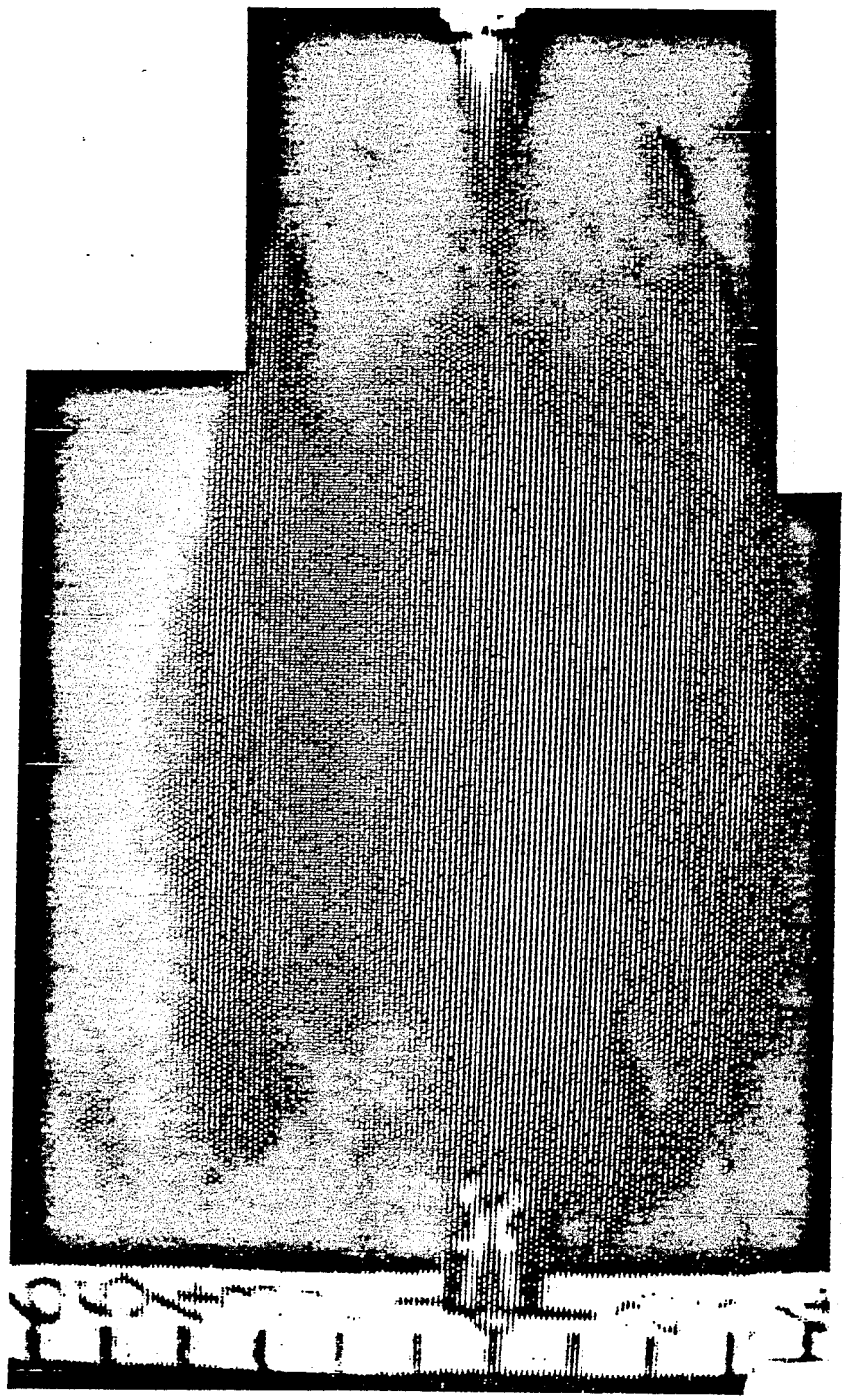
Figure 4C:
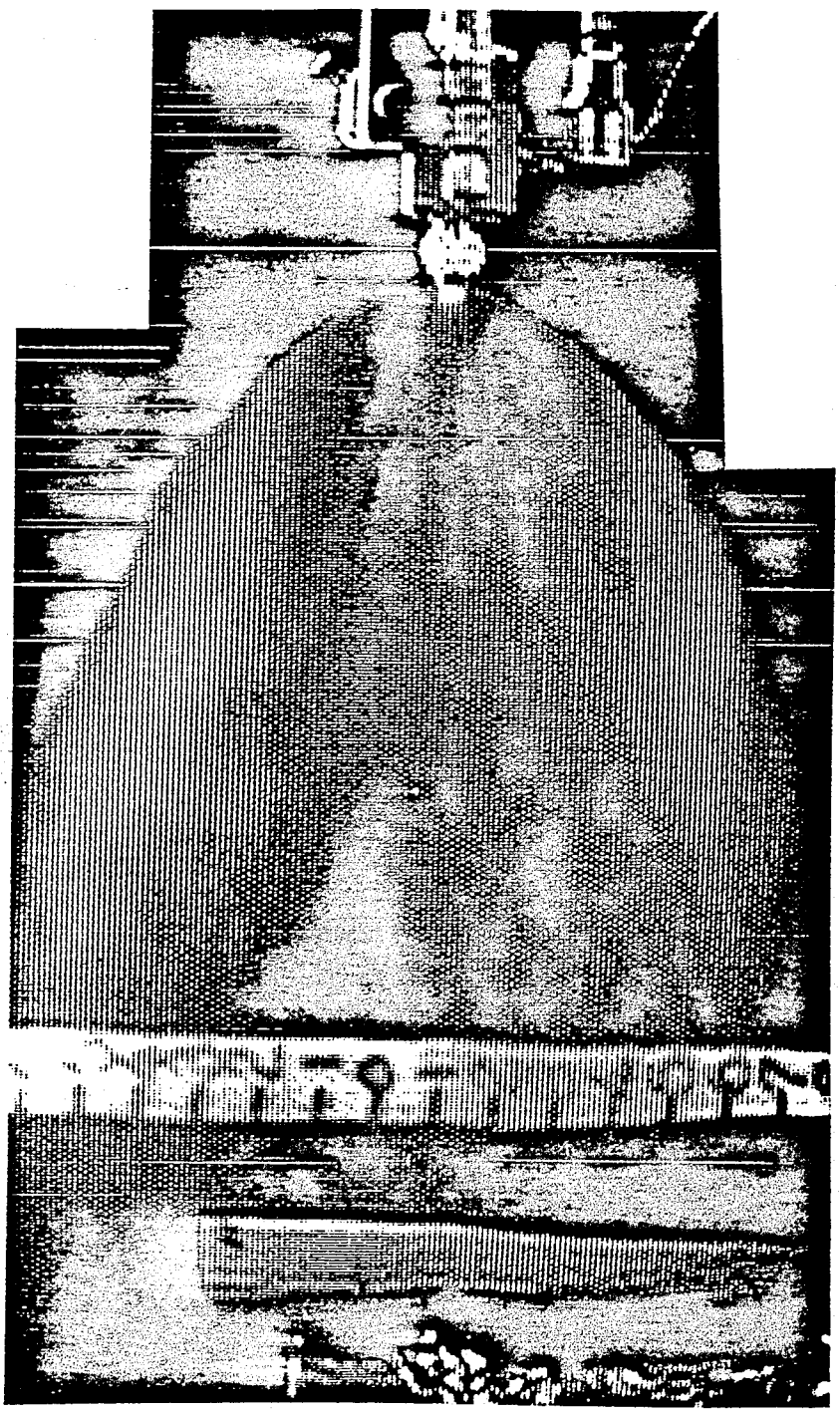

It is certified that error appears in the above-identified patent and that said Letters Patent is hereby corrected as shown below:

Column 23, before line 1, the following paragraph should be inserted in its entirety:

--The apparatus listed in Table 4 above is assembled as shown in the schematic representation contained in Figure 4. Rigid connections were made with Dekuron 1/4-inch diameter, .036-inch thick, seamless, welded, type 304 stainless steel hydraulic tubing ASTM A-269 with 5000-psi pressure rating, using Swagelok$^{TM}$ fittings. The pressure tank (17) is connected to the pump (8) using a Graco 3/8-inch static-free nylon high-pressure hose model #061-221 with 3000-psi pressure rating. All other flexible connections are made using Graco 1/4-inch static-free nylon high-pressure hoses model #061-214 with 5000-psi pressure rating.--.

Column 23, line 3, "Hydra-Cat#" should read --Hydra-Cat$^{TM}$--.

Column 23, line 4, "proPortions" should read --proportions--.

Column 23, line 28, after "particulates," insert --and fed through--.

Column 26, line 54, after "a", insert --9-mil orifice size and an 8-inch fan width rating.--.

UNITED STATES PATENT AND TRADEMARK OFFICE
CERTIFICATE OF CORRECTION

PATENT NO. : 5,009,367

DATED : April 23, 1991

INVENTOR(S) : Kenneth A. Nielsen

It is certified that error appears in the above-identified patent and that said Letters Patent is hereby corrected as shown below:

Column 28, line 13, "done" should read --dome--.

Column 29, line 9 (Claim 12, line 1), "sPrayed" should read --sprayed--.

Signed and Sealed this

Twenty-third Day of March, 1993

Attest:

STEPHEN G. KUNIN

*Attesting Officer*  Acting Commissioner of Patents and Trademarks